US010913331B2

(12) United States Patent
Ishida et al.

(10) Patent No.: US 10,913,331 B2
(45) Date of Patent: Feb. 9, 2021

(54) MOTOR-DRIVEN VEHICLE

(71) Applicant: HONDA MOTOR CO., LTD., Tokyo (JP)

(72) Inventors: Osamu Ishida, Wako (JP); Isao Tsunoda, Wako (JP); Yoshiyuki Takeuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 112 days.

(21) Appl. No.: 16/211,487

(22) Filed: Dec. 6, 2018

(65) Prior Publication Data
US 2019/0193521 A1    Jun. 27, 2019

(30) Foreign Application Priority Data
Dec. 21, 2017    (JP) ................................. 2017-245584

(51) Int. Cl.
*B60H 1/32*    (2006.01)
*B60H 1/00*    (2006.01)

(52) U.S. Cl.
CPC ....... *B60H 1/3208* (2013.01); *B60H 1/00385* (2013.01); *B60H 1/00921* (2013.01);
(Continued)

(58) Field of Classification Search
CPC .............. B60H 1/3208; B60H 1/00921; B60H 1/00385; B60H 2001/3277;
(Continued)

(56) References Cited

U.S. PATENT DOCUMENTS 9,577,291 B2 * 2/2017 Kolavennu ........ B60H 1/00278
10,654,341 B2 * 5/2020 Vehr .................... B60H 1/3205
(Continued)

FOREIGN PATENT DOCUMENTS

| CN | 107139678 A | * 9/2017 | ............. B60H 1/004 |
| JP | 2005-322454 | 11/2005 | |

(Continued)

OTHER PUBLICATIONS

Japanese Office Action for Japanese Patent Application No. 2017-245584 dated Jul. 30, 2019.

*Primary Examiner* — Nelson J Nieves
(74) *Attorney, Agent, or Firm* — Amin, Turocy & Watson, LLP

(57) ABSTRACT

A motor-driven vehicle includes an electric motor, a power storage device, a control device, and a refrigerant circuit. The refrigerant circuit has a compressor, an indoor heat exchanger, an expansion valve, and an outdoor heat exchanger. The indoor heat exchanger exchanges heat with the refrigerant compressed by the compressor. The refrigerant which passes through the indoor heat exchanger is decompressed by the expansion valve, and the outdoor heat exchanger exchanges heat with the decompressed refrigerant and allows the refrigerant to return to the compressor. When the remaining capacity of the power storage device is equal to or more than a predetermined value, the control device operates the compressor and decreases a passing-through air volume of a first air guide device that controls a passing-through air volume of the outdoor heat exchanger.

8 Claims, 14 Drawing Sheets

(52) U.S. Cl.
  CPC ............... *B60H 2001/3272* (2013.01); *B60H 2001/3273* (2013.01); *B60H 2001/3277* (2013.01); *B60H 2001/3285* (2013.01)

(58) Field of Classification Search
  CPC .... B60H 2001/3273; B60H 2001/3285; B60H 2001/3272
  See application file for complete search history.

(56) References Cited

U.S. PATENT DOCUMENTS

| | | | |
|---|---|---|---|
| 2017/0054188 A1* | 2/2017 | Blatchley | B60H 1/00899 |
| 2018/0029436 A1* | 2/2018 | Zaeri | B60H 1/3232 |
| 2018/0162377 A1* | 6/2018 | Colavincenzo | B60L 50/15 |
| 2019/0275866 A1* | 9/2019 | Vehr | B60H 1/005 |

FOREIGN PATENT DOCUMENTS

| | | | | |
|---|---|---|---|---|
| JP | 2015-162947 | 9/2015 | | |
| JP | 2017-189079 | 10/2017 | | |
| JP | 2017-208898 | 11/2017 | | |
| WO | WO-2010078459 A1 * | 7/2010 | ............. | F24F 3/044 |
| WO | WO-2015090191 A1 * | 6/2015 | ............. | B60H 1/004 |
| WO | WO-2017073669 A1 * | 5/2017 | ............. | B60H 1/3213 |
| WO | WO-2018005957 A1 * | 1/2018 | ............. | B60H 1/3205 |

* cited by examiner

MOTOR-DRIVEN VEHICLE

CROSS-REFERENCE TO RELATED APPLICATION

Priority is claimed on Japanese Patent Application No. 2017-245584, filed on Dec. 21, 2017, the contents of which are incorporated herein by reference.

BACKGROUND

Field of the Invention

The present invention relates to a motor-driven vehicle.

Background

In a motor-driven vehicle, an electric motor functions as a power generator at the time of braking. That is, the rotation of a drive wheel is transmitted to an output shaft of the electric motor, and electric power is regenerated by the electric motor by the rotation of the output shaft. A regenerated alternating current is converted into a direct current by an inverter, the converted direct current is supplied from the inverter to a power storage device, and the power storage device is charged.

As a motor-driven vehicle, one such vehicle is known having a configuration in which an amount of electric power regenerated in an electric motor is limited when a remaining capacity of a power storage device exceeds a predetermined value in order to protect the power storage device from overcharging. However, when an amount of electric power regenerated by the electric motor is limited, a regenerative braking force becomes less than that in a normal state, and unease due to a change in a braking feeling is caused in an occupant. On the other hand, when the limitation of the amount of electric power regenerated during braking is released while giving priority to reducing the change in a braking feeling, deterioration of a battery due to overcharging occurs.

As a countermeasure, a means for increasing power consumption of an electrical load (hereinafter, referred to as a vehicular air conditioner) mounted in a motor-driven vehicle when a remaining capacity of the power storage device exceeds a predetermined value at the time of generation of a regenerative braking force has been disclosed.

Further, a method of operating a cooling device that cools a vehicle interior and a heating device that heats the vehicle interior in parallel when the remaining capacity of the power storage device exceeds a predetermined value during regeneration by the electric motor has been disclosed (for example, refer to Japanese Unexamined Patent Application, First Publication No. 2015-162947).

SUMMARY

In the vehicular air conditioner described in Japanese Unexamined Patent Application, First Publication No. 2015-162947, a cooling circuit and a heating circuit are completely separated from each other.

On the other hand, a motor-driven vehicle is known which includes a vehicular air conditioner including a heat pump cycle and is thereby capable of performing cooling and heating of the vehicle interior using the vehicular air conditioner. However, in such a motor-driven vehicle, an operation of increasing power consumption of the vehicular air conditioner when the remaining capacity of a power storage device exceeds a predetermined value during regeneration by an electric motor is not disclosed.

An aspect of the present invention provides a motor-driven vehicle that is capable of increasing power consumption of a vehicular air conditioner including a heat pump cycle when the remaining capacity of a power storage device exceeds a predetermined value during regeneration by an electric motor.

An aspect of the present invention is a motor-driven vehicle that includes an electric motor, a power storage device that is electrically connected to the electric motor, and a control device that controls the electric motor and the power storage device, the motor-driven vehicle including a refrigerant circuit which has: a compressor that compresses and discharges an intake refrigerant; an indoor heat exchanger that exchanges heat with the compressed refrigerant; an expansion valve that decompresses the refrigerant which passes through the indoor heat exchanger; and an outdoor heat exchanger that exchanges heat with the decompressed refrigerant and allows the refrigerant to return to the compressor, wherein when a remaining capacity of the power storage device is equal to or more than a predetermined value, the control device operates the compressor and decreases a passing-through air volume of a first air guide device that controls a passing-through air volume of the outdoor heat exchanger to be less than a passing-through air volume of the first air guide device when the remaining capacity of the power storage device is less than the predetermined value.

Here, when the power storage device is charged with electric power regenerated by the electric motor, increasing power consumption of the motor-driven vehicle in order to protect the power storage device from overcharging is defined as a waste power control in the following description.

According to the motor-driven vehicle, when the remaining capacity of the power storage device is equal to or more than the predetermined value during regeneration by the electric motor, by the waste power control, the compressor is operated, and the passing-through air volume of the outdoor heat exchanger is decreased. Accordingly, the intake refrigerant pressure of the compressor is decreased in comparison with that before the power waste control, and in order to obtain the same heating capability as that before the power waste control, an intake refrigerant density becomes thin, and the refrigerant flow rate is decreased. That is, by decreasing the passing-through air volume of the outdoor heat exchanger, it becomes possible to decrease the efficiency of the heating operation.

In this state, in order to obtain the same heating capability as that before the power waste control, it is necessary to increase the rotation speed of the compressor and increase the refrigerant flow rate. By increasing the rotation speed of the compressor, it is possible to increase the power consumption of the compressor. In the power waste control, when the power consumption of the compressor is larger than the electric power generated by the electric motor, it is possible to prevent overcharging of the power storage device. When the power consumption of the compressor is smaller than the electric power generated by the electric motor, it is possible to decrease the rate of increase of the remaining capacity of the power storage device.

Another aspect of the present invention is a motor-driven vehicle that includes an electric motor, a power storage device that is electrically connected to the electric motor, and a control device that controls the electric motor and the power storage device, the motor-driven vehicle including a refrigerant circuit which has: a compressor that compresses and discharges an intake refrigerant; an indoor heat exchanger that exchanges heat with the compressed refrigerant; an expansion valve that decompresses the refrigerant which passes through the indoor heat exchanger; and an outdoor heat exchanger that exchanges heat with the decompressed refrigerant and allows the refrigerant to return to the compressor, wherein when a remaining capacity of the power storage device is equal to or more than a predetermined value, the control device operates the compressor and decreases a passing-through air volume of a second air guide device that controls a passing-through air volume of the indoor heat exchanger to be less than a passing-through air volume of the second air guide device when the remaining capacity of the power storage device is less than the predetermined value.

According to the motor-driven vehicle, when the remaining capacity of the power storage device is equal to or more than a predetermined value during regeneration by the electric motor, by the waste power control, the compressor is operated, and the passing-through air volume of the indoor heat exchanger is decreased. Accordingly, it becomes possible to decrease the efficiency of the heating operation to be less than that before the waste power control.

In this state, in order to obtain the same heating capability as that before the power waste control, it is necessary to increase the rotation speed of the compressor and increase the temperature of the indoor heat exchanger. By increasing the rotation speed of the compressor, it is possible to increase the power consumption of the compressor. In the power waste control, when the power consumption of the compressor is larger than the electric power generated by the electric motor, it is possible to prevent overcharging of the power storage device. When the power consumption of the compressor is smaller than the electric power generated by the electric motor, it is possible to decrease the rate of increase of the remaining capacity of the power storage device.

In the above motor-driven vehicle, when the remaining capacity of the power storage device is equal to or more than the predetermined value, the control device may reduce an aperture degree of the expansion valve to be less than an aperture degree of the expansion valve when the remaining capacity of the power storage device is less than the predetermined value.

In this way, by operating the compressor and decreasing the aperture degree of the expansion valve by the waste power control, the discharge refrigerant pressure of the compressor is increased in comparison with that before the power waste control. Accordingly, the compression efficiency of the compressor is degraded, the refrigerant flow rate is decreased, and it becomes possible to decrease the efficiency of the heating operation.

In this state, in order to obtain the same heating capability as that before the power waste control, it is necessary to increase the rotation speed of the compressor and increase the refrigerant flow rate that is discharged from the compressor. By increasing the rotation speed of the compressor, it is possible to increase the power consumption of the compressor. In the power waste control, when the power consumption of the compressor is larger than the electric power generated by the electric motor, it is possible to prevent overcharging of the power storage device.

When the power consumption of the compressor is smaller than the electric power generated by the electric motor, it is possible to decrease the rate of increase of the remaining capacity of the power storage device.

Still another aspect of the present invention is a motor-driven vehicle that includes an electric motor, a power storage device that is electrically connected to the electric motor, and a control device that controls the electric motor and the power storage device, the motor-driven vehicle including a refrigerant circuit which has: a compressor that compresses and discharges an intake refrigerant; an indoor heat exchanger that exchanges heat with the compressed refrigerant; an expansion valve that decompresses the refrigerant which passes through the indoor heat exchanger; and an outdoor heat exchanger that exchanges heat with the decompressed refrigerant and allows the refrigerant to return to the compressor, wherein when a remaining capacity of the power storage device is equal to or more than a predetermined value, the control device operates the compressor and increases an aperture degree of the expansion valve to be more than an aperture degree of the expansion valve when the remaining capacity of the power storage device is less than the predetermined value.

According to the motor-driven vehicle, when the remaining capacity of the power storage device is equal to or more than the predetermined value during regeneration by the electric motor, by the waste power control, the compressor is operated, and the aperture degree of the expansion valve is increased. Accordingly, the refrigerant passing-through area of the expansion valve is increased, and the discharge refrigerant pressure of the compressor is decreased in comparison with that before the power waste control. Thereby, it becomes possible to decrease the efficiency of the heating operation to be less than that before the power waste control.

In this state, in order to obtain the same heating capability as that before the power waste control, it is necessary to increase the pressure of the refrigerant supplied to the indoor heat exchanger. That is, it is necessary to increase the rotation speed of the compressor and increase the refrigerant flow rate that is discharged from the compressor. By increasing the rotation speed of the compressor, it is possible to increase the power consumption of the compressor. In the power waste control, when the power consumption of the compressor is larger than the electric power generated by the electric motor, it is possible to prevent overcharging of the power storage device. When the power consumption of the compressor is smaller than the electric power generated by the electric motor, it is possible to decrease the rate of increase of the remaining capacity of the power storage device.

In the above motor-driven vehicle, the control device may allow the aperture degree of the expansion valve to be in a fully open state when the remaining capacity of the power storage device is equal to or more than the predetermined value.

In this way, by operating the compressor and controlling the aperture degree of the expansion valve to be in a fully open state, the refrigerant passing-through area of the expansion valve is increased to the maximum. In comparison with a situation before the power waste control, the heating operation mode of the vehicular air conditioner transitions to a hot-gas operation, and it becomes impossible to perform absorption of heat by the outdoor heat exchanger. That is, the amount of work of the compressor becomes equivalent to the heating capability. Accordingly, in order to secure the heating of the vehicular air conditioner similar to that before the power waste control, it is necessary to increase the rotation speed of the compressor. By increasing the rotation speed of the compressor, the discharge pressure of the refrigerant discharged from the compressor is increased, the flow rate of the refrigerant is increased, and the heating similar to that before the power waste control is secured.

On the other hand, by increasing the rotation speed of the compressor, it is possible to increase the power consumption of the compressor. In the power waste control, when the power consumption of the compressor is larger than the electric power generated by the electric motor, it is possible to prevent overcharging of the power storage device. When the power consumption of the compressor is smaller than the electric power generated by the electric motor, it is possible to decrease the rate of increase of the remaining capacity of the power storage device.

Still another aspect of the present invention is a motor-driven vehicle that includes an electric motor, a power storage device that is electrically connected to the electric motor, and a control device that controls the electric motor and the power storage device, the motor-driven vehicle including a refrigerant circuit which has: a compressor that compresses and discharges an intake refrigerant; an indoor heat exchanger that exchanges heat with the compressed refrigerant; an expansion valve that decompresses the refrigerant which passes through the indoor heat exchanger; an outdoor heat exchanger that exchanges heat with the decompressed refrigerant and allows the refrigerant to return to the compressor; a first air guide device that controls a passing-through air volume of the outdoor heat exchanger; and a second air guide device that controls a passing-through air volume of the indoor heat exchanger, wherein when a remaining capacity of the power storage device is equal to or more than a predetermined value, the control device operates the compressor and controls the expansion valve, the first air guide device, and the second air guide device in accordance with a magnitude of electric energy regenerated by the electric motor.

According to the motor-driven vehicle, when the remaining capacity of the power storage device is equal to or more than the predetermined value during regeneration by the electric motor, by the waste power control, the compressor is operated, and the passing-through air volume of the outdoor heat exchanger, the passing-through air volume of the indoor heat exchanger, and the aperture degree of the expansion valve are adjusted in accordance with the magnitude of the regenerated electric energy. Accordingly, it becomes possible to decrease the efficiency of the heating operation in accordance with the regenerated electric energy. That is, it is possible to prevent excessive waste of electric power regenerated by the electric motor.

In this state, in order to obtain the same heating capability as that before the power waste control, it is necessary to increase the rotation speed of the compressor. By increasing the rotation speed of the compressor, it is possible to increase the power consumption of the compressor. In the power waste control, when the power consumption of the compressor is larger than the electric power generated by the electric motor, it is possible to prevent overcharging of the power storage device. When the power consumption of the compressor is smaller than the electric power generated by the electric motor, it is possible to decrease the rate of increase of the remaining capacity of the power storage device.

Thereby, it is possible to prevent excessive power waste by the power waste control and also satisfy a power waste request.

In other words, it is possible to prevent a reduction in SOC when regeneration is completed and prevent a situation in which regeneration is unavailable (insufficient regenerative torque) due to full charging of the power storage device.

According to an aspect of the present invention, it is possible to increase power consumption of the vehicular air conditioner including the heat pump cycle when the remaining capacity of the power storage device exceeds the predetermined value during regeneration by the electric motor.

DESCRIPTION OF THE EMBODIMENTS

An embodiment of the invention will be described with reference to the drawings.

The embodiment is described using an electric vehicle (a battery electric vehicle (BEV)) as an example of a motor-driven vehicle, but the invention is not limited thereto. For example, the invention may be applied to another vehicle such as a hybrid vehicle (HV) and a fuel-cell vehicle (FCV).

Figure 1:
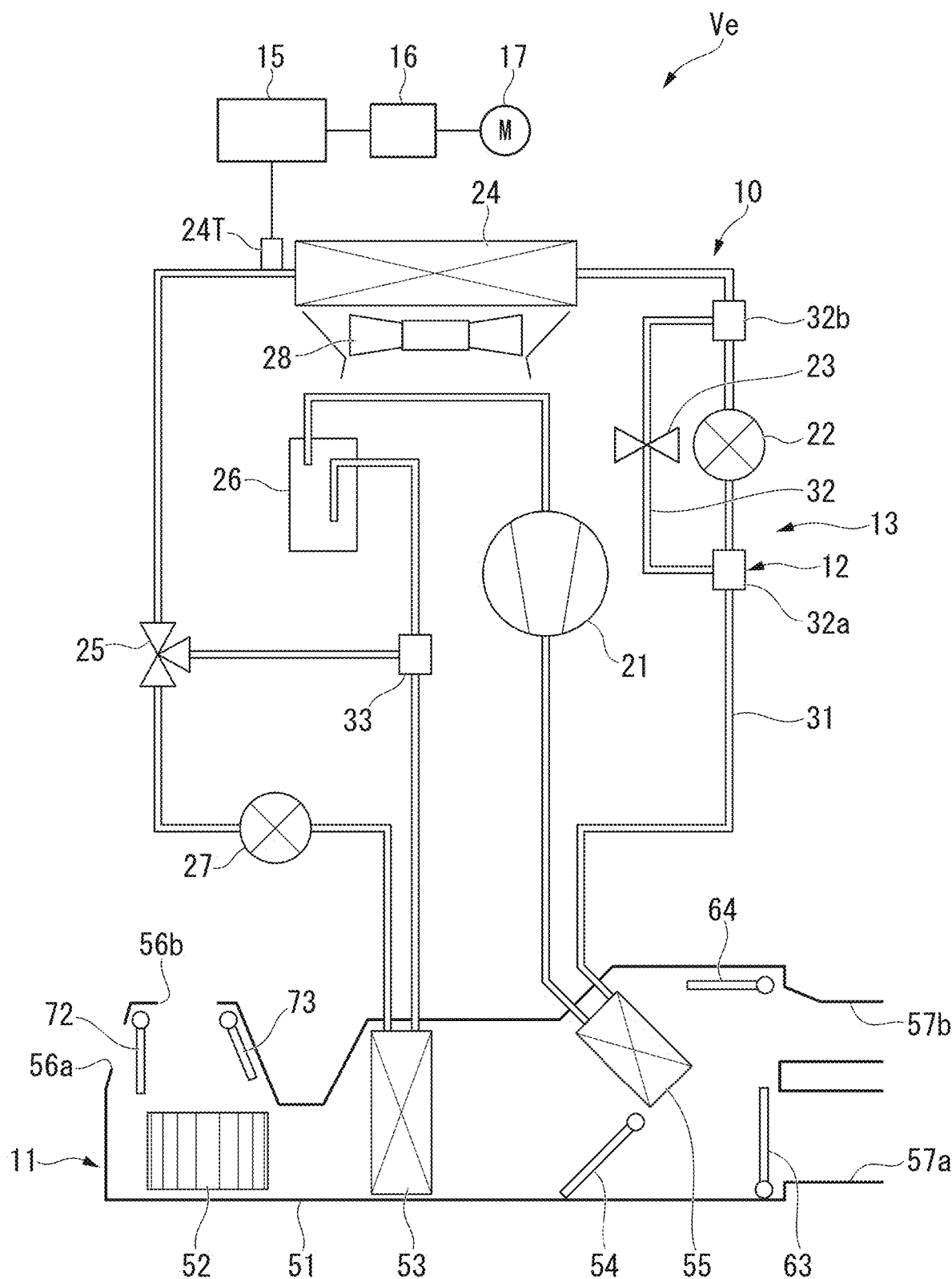
FIG. 1 is a view showing a configuration of a motor-driven vehicle including a vehicular air conditioner according to an embodiment of the invention.

FIG. 1 is a view showing a configuration of a motor-driven vehicle Ve including a vehicular air conditioner 10.

As shown in FIG. 1, the vehicular air conditioner 10 is mounted on the motor-driven vehicle Ve such as an electric vehicle that does not include an engine (an internal combustion engine) as a vehicle drive source. The motor-driven vehicle Ve is an electric vehicle including the vehicular air conditioner 10, a control device (ECU: electronic control unit) 15, a power storage device (a battery) 16, and an electric motor (a traveling motor) 17.

The electric motor 17 is electrically connected to the power storage device 16 via an inverter (not shown). When the electric motor 17 is activated, a direct current which is output from the power storage device 16 is converted into an alternating current by the inverter and is supplied to the electric motor 17. The alternating current is supplied to the electric motor 17, and thereby, the electric motor 17 generates a driving force. By the electric motor 17 generating the driving force, a drive wheel is rotationally driven in a frontward proceeding direction or a rearward proceeding direction.

On the other hand, when the motor-driven vehicle Ve is braked, the electric motor 17 functions as a power generator. That is, the rotation of the driving wheel is transmitted to an output shaft of the electric motor 17, and electric power is regenerated at the electric motor 17 by the rotation of the output shaft. At this time, the electric motor 17 serves as a resistive element and a resistive force acts as a regenerative braking force on the motor-driven vehicle Ve. An alternating current regenerated by the electric motor 17 is converted into a direct current by the inverter. The converted direct current is supplied from the inverter to the power storage device 16 and is stored in the power storage device 16.

The vehicular air conditioner 10 is mounted on the motor-driven vehicle Ve. The vehicular air conditioner 10 mainly includes an air-conditioning unit 11 and a heat pump cycle 12 in which a refrigerant is capable of being circulated.

The air-conditioning unit 11 includes a duct 51 in which conditioning air flows, a blower 52, an evaporator 53, a second air guide means (an air mix door) 54, and an indoor heat exchanger (an indoor condenser) 55. The blower 52, the evaporator 53, the second air guide means 54 (second air guide device), and the indoor heat exchanger 55 are accommodated in the duct 51.

The duct 51 has air inlets 56a, 56b and air outlets 57a, 57b.

The blower 52, the evaporator 53, the second air guide means 54, and the indoor heat exchanger 55 are arranged in this order from an upstream side (the air inlets 56a, 56b side) in a flowing direction of conditioning air in the duct 51 to a downstream side (the air outlets 57a, 57b side).

The air inlet 56a constitutes an indoor air inlet that takes in indoor air. The air inlet 56b constitutes an outdoor air inlet that takes in outdoor air. The air inlet 56a is opened and closed by an indoor air door 72. The air inlet 56b is opened and closed by an outdoor air door 73. For example, aperture degrees of the indoor air door 72 and the outdoor air door 73 are adjusted under the control by the control device 15, and thereby, a flow rate ratio between indoor air and outdoor air that flow into the duct 51 is adjusted.

The air outlet 57a constitutes a VENT outlet. The air outlet 57b constitutes a DEF outlet. The air outlet 57a is formed to be capable of being opened and closed by a VENT door 63. The air outlet 57b is formed to be capable of being opened and closed by a DEF door 64. In the air outlets 57a, 57b, air proportions that are blown out from the air outlets 57a, 57b are adjusted, for example, by switching between opening and closing of the VENT door 63 and the DEF door 64 under the control by the control device 15.

The blower 52 is driven by a motor, for example, in accordance with a drive voltage which is applied to the motor under the control by the control device 15. The blower 52 sends conditioning air (at least one of indoor air and outdoor air) which is taken in the duct 51 from the air inlets 56a, 56b to the downstream side, that is, toward the evaporator 53 and the indoor heat exchanger 55.

The evaporator 53 performs heat exchange between a low-pressure refrigerant flowing to the inside of the evaporator 53 and a vehicle interior atmosphere (inside the duct 51) and cools conditioning air passing through the evaporator 53, for example, by heat absorption when the refrigerant is evaporated.

The indoor heat exchanger 55 is capable of exchanging heat with a compressed high-temperature high-pressure refrigerant which flows to the inside of the indoor heat exchanger 55. The indoor heat exchanger 55 heats conditioning air passing through the indoor heat exchanger 55, for example, by radiating heat.

The second air guide means 54 is operated to swing, for example, under the control by the control device 15. The second air guide means 54 swings between a heating position at which an air flow passage from the downstream of the evaporator 53 toward the indoor heat exchanger 55 in the duct 51 is open and a cooling position at which an air flow passage that bypasses the indoor heat exchanger 55 is open. Thereby, in the conditioning air passing through the evaporator 53, an air volume ratio between an air volume which is introduced into the indoor heat exchanger 55 and an air volume which bypasses the indoor heat exchanger 55 and is discharged into the vehicle interior is adjusted.

The heat pump cycle 12 includes, for example, the evaporator 53 described above, the indoor heat exchanger 55 described above, a compressor 21 that compresses a refrigerant, an expansion valve (a heating decompression valve) 22, a cooling electromagnetic valve 23, an outdoor heat exchanger 24, a three-way valve 25, a gas-liquid separator 26, and a cooling decompression valve 27. The constituent members of the heat pump cycle 12 are connected via a refrigerant flow passage 31. The refrigerant flow passage 31 is a flow passage in which a refrigerant is capable of circulating.

A refrigerant circuit 13 is constituted of the heat pump cycle 12, the evaporator 53, and the indoor heat exchanger 55. That is, the refrigerant circuit 13 is provided on the motor-driven vehicle Ve.

The compressor 21 is connected between the gas-liquid separator 26 and the indoor heat exchanger 55, takes in a refrigerant on the gas-liquid separator 26 side, and discharges the refrigerant to the indoor heat exchanger 55 side. The compressor 21 is driven by a motor, for example, in accordance with a drive voltage applied to the motor under the control by the control device 15.

The compressor 21 takes in a gas-phase refrigerant (a refrigerant gas) from the gas-liquid separator 26, compresses the refrigerant, and then discharges the compressed refrigerant as a high-temperature and high-pressure refrigerant to the indoor heat exchanger 55 described above.

The expansion valve 22 and the cooling electromagnetic valve 23 are arranged in parallel on the refrigerant flow passage 31 at the downstream side of the indoor heat exchanger 55.

The expansion valve 22 is, for example, a throttle valve of which a diameter of an opening part is capable of being adjusted. The expansion valve 22 decompresses and expands a refrigerant having passed through the indoor heat exchanger 55 and then discharges the refrigerant as a mist-like low-temperature low-pressure refrigerant of two phases of gas and liquid (liquid phase-rich) to the outdoor heat exchanger 24.

The cooling electromagnetic valve 23 connects together a first branch portion 32a and a second branch portion 32b each of which is provided on each of both sides of the expansion valve 22 on the refrigerant flow passage 31 and is provided on a bypass flow passage 32 which bypasses the expansion valve 22. The cooling electromagnetic valve 23 is opened and closed, for example, under the control by the control device 15. The cooling electromagnetic valve 23 is in a closed state when a heating operation is performed and is in an opened state when a cooling operation is performed.

Thereby, for example, when a heating operation is performed, a refrigerant discharged from the indoor heat exchanger 55 is greatly decompressed by the expansion valve 22 and flows into the outdoor heat exchanger 24 in a low-temperature and low-pressure state. On the other hand, when a cooling operation is performed, a refrigerant discharged from the indoor heat exchanger 55 passes through the cooling electromagnetic valve 23 and flows into the outdoor heat exchanger 24 in a high-temperature state.

The outdoor heat exchanger 24 is disposed at a vehicle exterior and performs heat exchange between the refrigerant flowing to the inside of the outdoor heat exchanger 24 and a vehicle exterior atmosphere. An outlet temperature sensor 24T that detects a temperature (a refrigerant outlet temperature Tout) of a refrigerant flowing from the outlet of the outdoor heat exchanger 24 is provided on the downstream side of the outdoor heat exchanger 24. A signal indicating the refrigerant temperature detected by the outlet temperature sensor 24T is input to the control device 15. The signal input from the outlet temperature sensor 24T to the control device 15 is used for performing determination of a variety of air-conditioning controls in the control device 15.

When a heating operation is performed, the outdoor heat exchanger 24 is capable of absorbing heat from the vehicle exterior atmosphere using the low-temperature and low-pressure refrigerant flowing to the inside of the outdoor heat exchanger 24 and increases the temperature of the refrigerant by absorption of heat from the vehicle exterior atmosphere. On the other hand, when a cooling operation is performed, the outdoor heat exchanger 24 is capable of releasing heat to the vehicle exterior atmosphere using the high-temperature refrigerant flowing to the inside of the outdoor heat exchanger 24 and cools the refrigerant by radiation of heat to the vehicle exterior atmosphere and blowing of air by a first air guide means 28.

An example of the first air guide means 28 is a condenser fan that controls a passing-through air volume of the outdoor heat exchanger 24, and, for example, a grille shutter or the like may be used as another example. When the first air guide means 28 is a condenser fan, the condenser fan is driven, for example, based on a drive voltage applied to a motor of the condenser fan under the control by the control device 15.

The three-way valve 25 switches the refrigerant flowing out of the outdoor heat exchanger 24 to the gas-liquid separator 26 or the cooling decompression valve 27 and discharges the refrigerant. Specifically, the three-way valve 25 is connected to the outdoor heat exchanger 24, a merging portion 33 arranged on the gas-liquid separator 26 side, and the cooling decompression valve 27, and a flowing direction of the refrigerant is changed, for example, under the control by the control device 15.

When a heating operation is performed, the three-way valve 25 discharges the refrigerant flowing out of the outdoor heat exchanger 24 toward the merging portion 33 on the gas-liquid separator 26 side. On the other hand, when a cooling operation is performed, the three-way valve 25 discharges the refrigerant flowing out of the outdoor heat exchanger 24 toward the cooling decompression valve 27.

The gas-liquid separator 26 is connected between the merging portion 33 and the compressor 21 in the refrigerant flow passage 31, separates a gas from a liquid in the refrigerant flowing out of the merging portion 33, and allows the gas-phase refrigerant (a refrigerant gas) to be taken into (return to) the compressor 21.

The cooling decompression valve 27 is a so-called throttle valve and is connected between the three-way valve 25 and an inlet of the evaporator 53. The cooling decompression valve 27 decompresses and expands the refrigerant flowing out of the three-way valve 25, for example, in accordance with a valve aperture degree controlled by the control device 15 and then discharges the refrigerant as a low-temperature low-pressure mist-like refrigerant of two phases of gas and liquid (liquid phase-rich) to the evaporator 53.

The evaporator 53 is connected between the cooling decompression valve 27 and the merging portion 33 (the gas-liquid separator 26).

The control device 15 performs an air-conditioning control using a refrigerant in the air-conditioning unit 11 and the heat pump cycle 12. The control device 15 controls the vehicular air conditioner 10 based on a command signal input by an operator via a switch or the like (not shown) which is disposed at the vehicle interior. The control device 15 controls the electric motor 17 and the power storage device 16 and is further capable of performing a control of switching an operation mode of the vehicular air conditioner 10 to a heating operation mode, a cooling operation mode, or the like.

Information of a state of charge (SOC) which is a charging rate of the power storage device 16 and a chargeable power which is calculated based on the SOC is input to the control device 15. The chargeable power is the electric power with which the power storage device 16 can be charged. The chargeable power can be acquired, for example, from a table in which the chargeable power decreases as the SOC increases and is 0 at an upper limit of the SOC in order to prevent overcharging of the power storage device 16.

The control device 15 determines whether or not a remaining capacity of the power storage device 16 is equal to or more than a predetermined value based on the chargeable power. Further, information of regenerative power supplied to the power storage device 16 is input to the control device 15.

The control device 15 includes a function of being capable of controlling the electric motor 17, the vehicular air conditioner 10, the compressor 21, the first air guide means (a fan) 28, and the like. For example, when the remaining capacity of the power storage device 16 is equal to or more than the predetermined value at the time of regeneration in the heating operation mode, the control device 15 can operate the compressor 21 and select and control the expansion valve 22, the first air guide means 28 (first air guide device), and the second air guide means 54.

Next, operations of the vehicular air conditioner 10 in the heating operation mode and the cooling operation mode will be described with reference to FIG. 2 and FIG. 3. First, the heating operation mode of the vehicular air conditioner 10 will be described with reference to FIG. 2.

(Heating Operation Mode)

Figure 2:
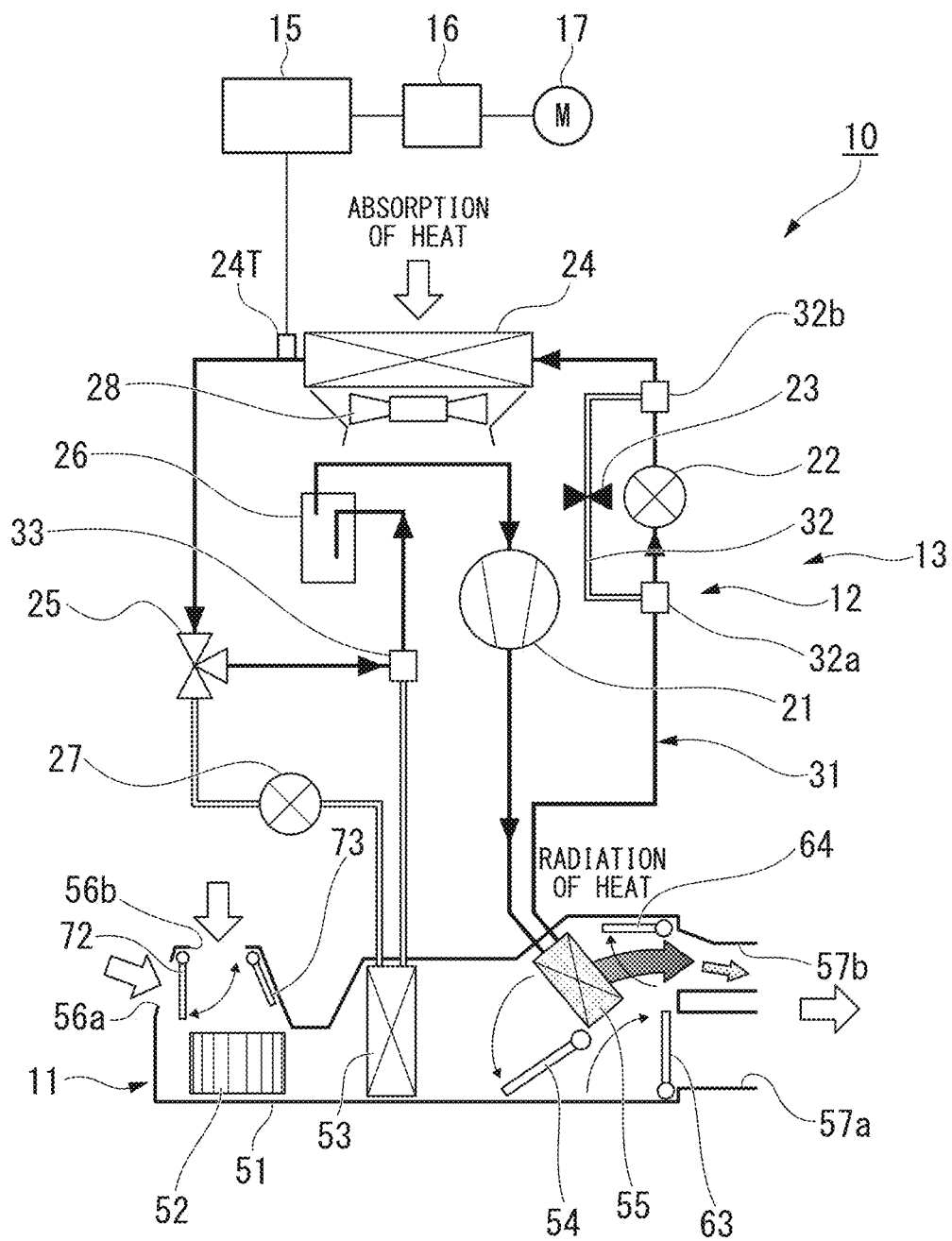
FIG. 2 is a configuration view showing a heating operation mode of the vehicular air conditioner according to the embodiment of the invention.

As shown in FIG. 2, when a heating operation is performed using the vehicular air conditioner 10, the second air guide means 54 is located at a heating position at which an air flowing path to the indoor heat exchanger 55 is open. The cooling electromagnetic valve 23 is closed, and the three-way valve 25 connects the outdoor heat exchanger 24 and the merging portion 33. In the air-conditioning unit 11 of the example of FIG. 2, the DEF door 64 is opened, and the VENT door 63 is closed. However, it is possible to arbitrarily change the opening and closing of the doors 63, 64 by an operator's operation.

In this case, in the heat pump cycle 12, the high-temperature and high-pressure refrigerant discharged from the compressor 21 heats conditioning air in the duct 51 of the air-conditioning unit 11 by radiation of heat in the indoor heat exchanger 55.

The refrigerant having passed through the indoor heat exchanger 55 is expanded (decompressed) into a liquid phase-rich mist-like state by the expansion valve 22, then exchanges heat (absorb heat from the vehicle exterior atmosphere) in the outdoor heat exchanger 24, and is brought into a gas phase-rich mist-like state. The refrigerant having passed through the outdoor heat exchanger 24 passes through the three-way valve 25 and the merging portion 33 and flows into the gas-liquid separator 26. The refrigerant flowing into the gas-liquid separator 26 is separated into a gas phase and liquid phase, and the refrigerant of a gas phase is suctioned by the compressor 21.

In this way, in a situation in which the refrigerant flows in the refrigerant flow passage 31 of the heat pump cycle 12, when the blower 52 of the air-conditioning unit 11 is driven, conditioning air flows in the duct 51 of the air-conditioning unit 11, and the conditioning air passes through the evaporator 53 and then passes through the indoor heat exchanger 55.

Then, the conditioning air exchanges heat with the indoor heat exchanger 55 at the time of passing through the indoor heat exchanger 55 and is supplied as heating air to the vehicle interior via the air outlet 57b.

Next, the cooling operation mode of the vehicular air conditioner 10 will be described with reference to FIG. 3.

(Cooling Operation Mode)

Figure 3:
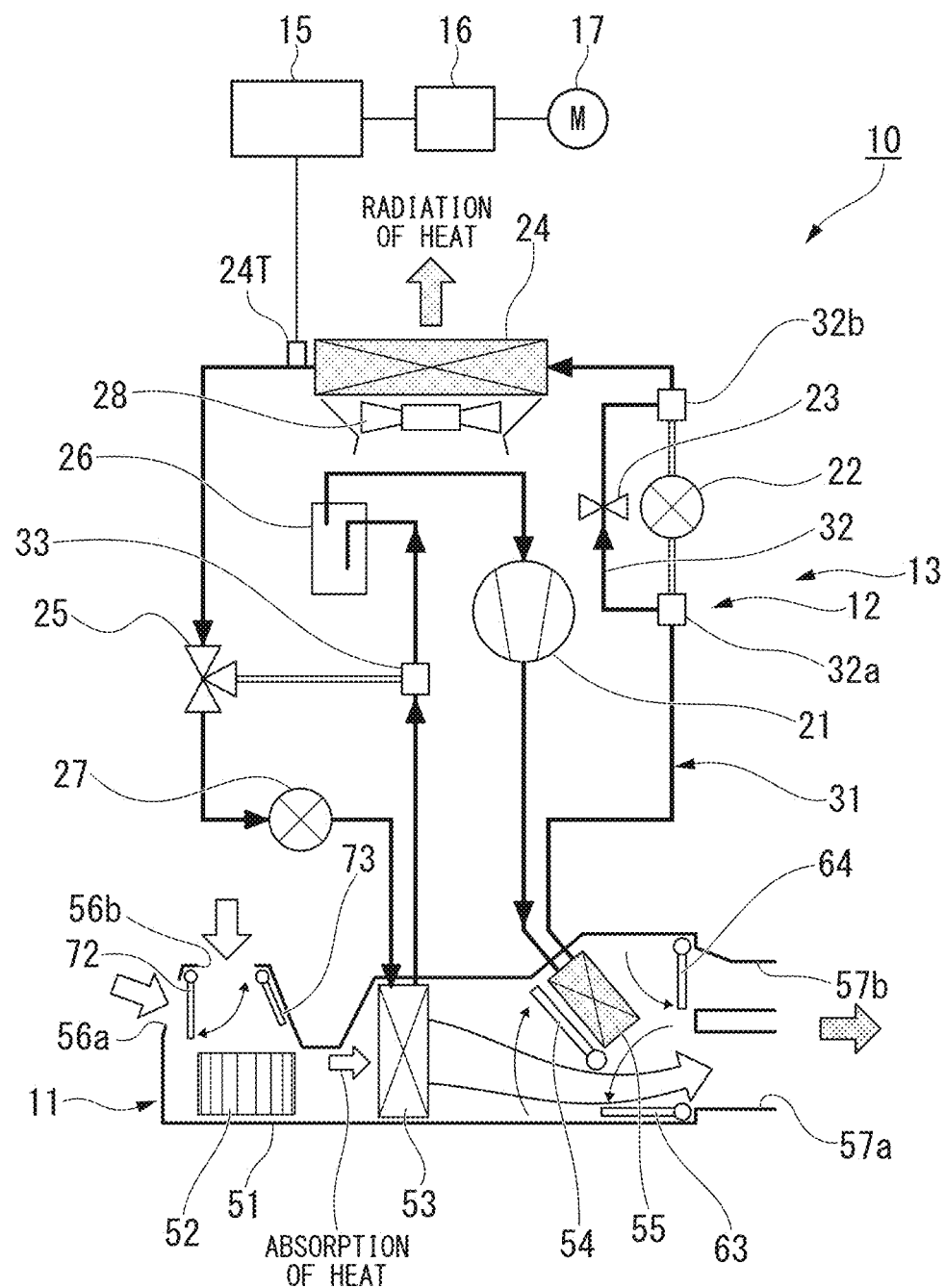
FIG. 3 is a configuration view showing a cooling operation mode of the vehicular air conditioner according to the embodiment of the invention.

As shown in FIG. 3, when a cooling operation is performed using the vehicular air conditioner 10, the second air guide means 54 is located at a cooling position at which conditioning air having passed through the evaporator 53 bypasses the indoor heat exchanger 55. Further, the cooling electromagnetic valve 23 is opened (the expansion valve 22 is closed), and the three-way valve 25 connects the outdoor heat exchanger 24 and the cooling decompression valve 27. In the example shown in FIG. 3, in the air-conditioning unit 11, the DEF door 64 is closed, and the VENT door 63 is opened. However it is possible to arbitrarily change the opening and closing of the doors 63, 64 by a driver's operation.

In this case, in the heat pump cycle 12, the high-temperature and high-pressure refrigerant discharged from the compressor 21 passes through the indoor heat exchanger 55 and the cooling electromagnetic valve 23, radiates heat to the vehicle exterior atmosphere in the outdoor heat exchanger 24, and then flows into the cooling decompression valve 27. At this time, the refrigerant is expanded into a liquid phase-rich mist-like state by the cooling decompression valve 27 and then cools the conditioning air in the duct 51 of the air-conditioning unit 11 by absorbing heat in the evaporator 53.

The refrigerant which is gas phase-rich having passed through the evaporator 53 passes through the merging portion 33, flows into the gas-liquid separator 26, and is separated into gas and liquid in the gas-liquid separator 26, and then the gas-phase refrigerant is suctioned by the compressor 21.

In this way, when the blower 52 of the air-conditioning unit 11 is driven in a situation in which the refrigerant flows in the refrigerant flow passage 31, the conditioning air flows in the duct 51 of the air-conditioning unit 11 and exchanges heat with the evaporator 53 at the time of passing through the evaporator 53. After that, the conditioning air bypasses the indoor heat exchanger 55 and is then supplied as cooling air to the vehicle interior via the VENT outlet (that is, an air outlet) 57a.

Next, an example in which power waste control is performed using the vehicular air conditioner 10 such that the remaining capacity of the power storage device 16 does not exceed the predetermined value when regenerative electric power is stored in the power storage device 16 in the heating operation mode of the vehicular air conditioner 10 will be described with reference to FIG. 4 to FIG. 19. Examples of the power waste control of the vehicular air conditioner 10 in the heating operation mode include first to sixth power waste controls. The first to sixth power waste controls will be sequentially described.

First, an example in which power consumption of the vehicular air conditioner 10 is increased by controlling the compressor 21 and the first air guide means 28 of the vehicular air conditioner 10 as the first power waste control will be described with reference to FIG. 4 to FIG. 6.

(First Power Waste Control)

Figure 5:
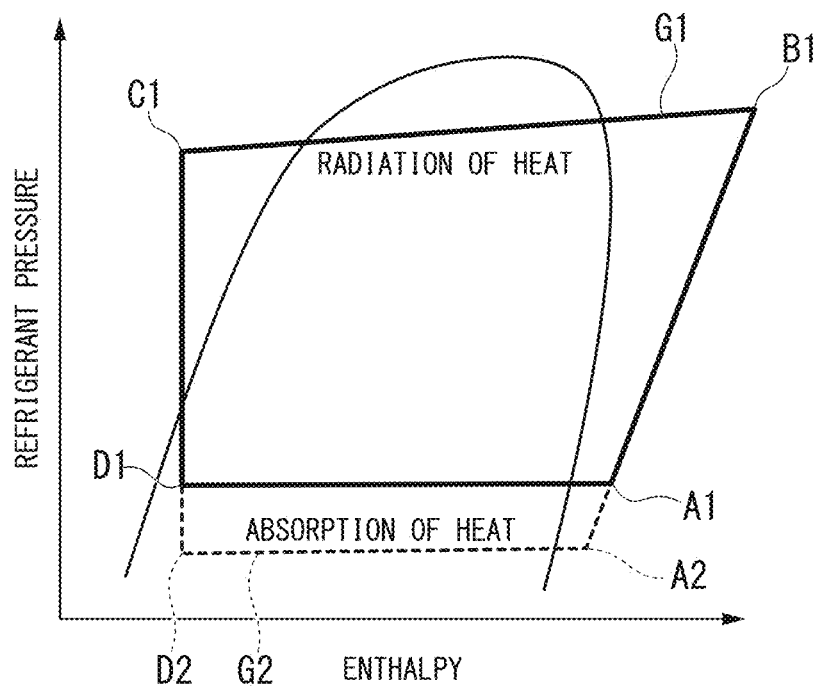
FIG. 5 is a view showing a refrigerant pressure-enthalpy diagram of the first waste power control of the motor-driven vehicle according to the embodiment of the invention.

FIG. 5 shows a refrigerant pressure-enthalpy diagram, where the vertical axis represents a refrigerant pressure, and the horizontal axis represents an enthalpy. In FIG. 5, a refrigerant pressure-enthalpy diagram G1 before the power waste control has been performed in the heating operation mode is indicated by a solid line. In the refrigerant pressure-enthalpy diagram G1, the change from a point A1 to a point B1 represents a refrigerant state change in the compressor 21. The change from the point B1 to a point C1 represents a refrigerant state change in the indoor heat exchanger 55. The change from the point C1 to a point D1 represents a refrigerant state change in the expansion valve 22. The change from the point D1 to the point A1 represents a refrigerant state change in the outdoor heat exchanger 24.

A refrigerant pressure-enthalpy diagram G2 after the power waste control has been performed is indicated by a dotted line. In the refrigerant pressure-enthalpy diagram G2, the change from a point A2 to the point B1 represents a refrigerant state change in the compressor 21. The change from the point B1 to the point C1 represents a refrigerant state change in the indoor heat exchanger 55. The change from the point C1 to a point D2 represents a refrigerant state change in the expansion valve 22. The change from the point D2 to the point A2 represents a refrigerant state change in the outdoor heat exchanger 24.

Figure 6:
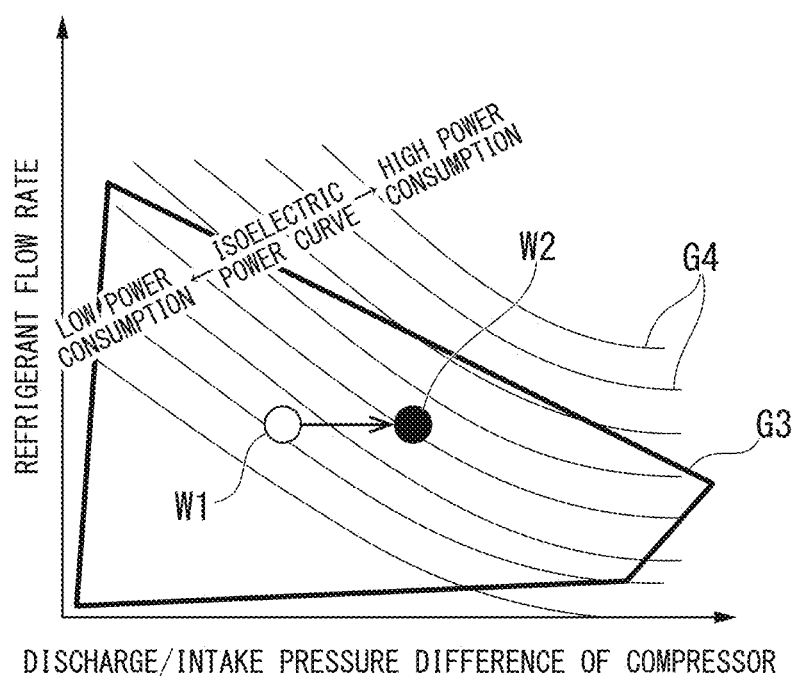
FIG. 6 is a diagram showing power consumption of the first waste power control of the motor-driven vehicle according to the embodiment of the invention.

FIG. 6 shows a relationship between a heating operation range of the vehicular air conditioner 10 and an isoelectric power curve, where the vertical axis represents a refrigerant flow rate, and the horizontal axis represents a discharge/intake pressure difference of the compressor. In FIG. 6, a heating operation range of the vehicular air conditioner 10 is indicated by a diagram G3, and the isoelectric power curve is indicated by a diagram G4. W1 denotes power consumption of the vehicular air conditioner 10 before the power waste control has been performed. W2 denotes power consumption of the vehicular air conditioner 10 after the power waste control has been performed.

Figure 4:
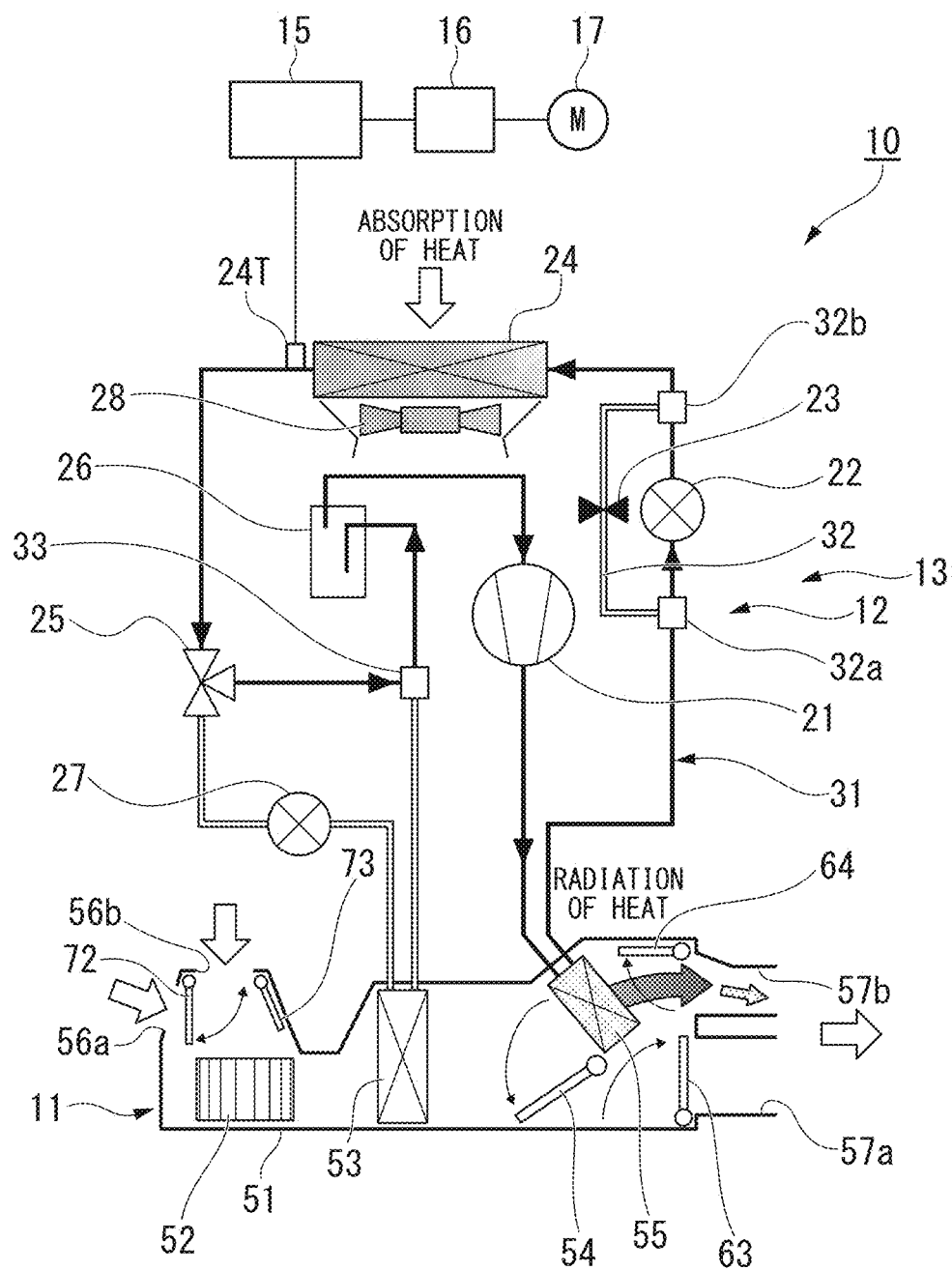
FIG. 4 is a configuration view showing a first waste power control of the motor-driven vehicle according to the embodiment of the invention.

As shown in FIG. 4, when the remaining capacity of the power storage device 16 is equal to or more than the predetermined value, the control device 15 controls the first air guide means 28 such that a passing-through air volume of the first air guide means 28 is decreased to be less than a passing-through air volume of the first air guide means 28 when the remaining capacity of the power storage device 16 is less than the predetermined value.

That is, when the first air guide means 28 is a condenser fan, the passing-through air volume of the first air guide means 28 is decreased by decreasing a rotation speed of the fan or stopping the rotation of the fan. When the first air guide means 28 is a grille shutter, the passing-through air volume of the first air guide means 28 is decreased by decreasing a gap of the grille shutter or closing the grille shutter.

The passing-through air volume of the outdoor heat exchanger 24 is decreased by decreasing the passing-through air volume of the first air guide means 28. Therefore, absorption of heat by the refrigerant flowing into the outdoor heat exchanger 24 is decreased. Accordingly, the refrigerant which is liquid phase-rich from the outdoor heat exchanger 24 passes through the gas-liquid separator 26, and a gas-phase refrigerant is suctioned by the compressor 21.

Accordingly, as shown in FIG. 4 and FIG. 5, an intake refrigerant pressure of the compressor 21 decreases in comparison with before the power waste control has been performed, and an intake refrigerant density decreases to decrease the refrigerant flow rate in order to obtain the same heating capability as before the power waste control has been performed. That is, by decreasing the passing-through air volume of the outdoor heat exchanger, it is possible to decrease the efficiency of the heating operation.

In this state, in order to obtain the same heating capability as before the power waste control has been performed, it is necessary to increase the rotation speed of the compressor 21 to increase the refrigerant flow rate. By increasing the rotation speed of the compressor 21, the power consumption in the compressor 21 is increased from W1 to W2 as shown in FIG. 4 and FIG. 6, and it is possible to secure an amount of waste power of the vehicular air conditioner 10.

Thereby, in the first power waste control, when the power consumption W2 of the compressor 21 is larger than the electric power generated by the electric motor 17, it is possible to prevent overcharging of the power storage device 16. When the power consumption W2 of the compressor 21 is smaller than the electric power generated by the electric motor 17, it is possible to decrease a rate of increase of the remaining capacity of the power storage device 16.

Next, an example in which power consumption of the vehicular air conditioner 10 is increased by controlling the compressor 21 and the second air guide means 54 of the vehicular air conditioner 10 as a second power waste control will be described with reference to FIG. 7 to FIG. 9.

(Second Power Waste Control)

Figure 8:
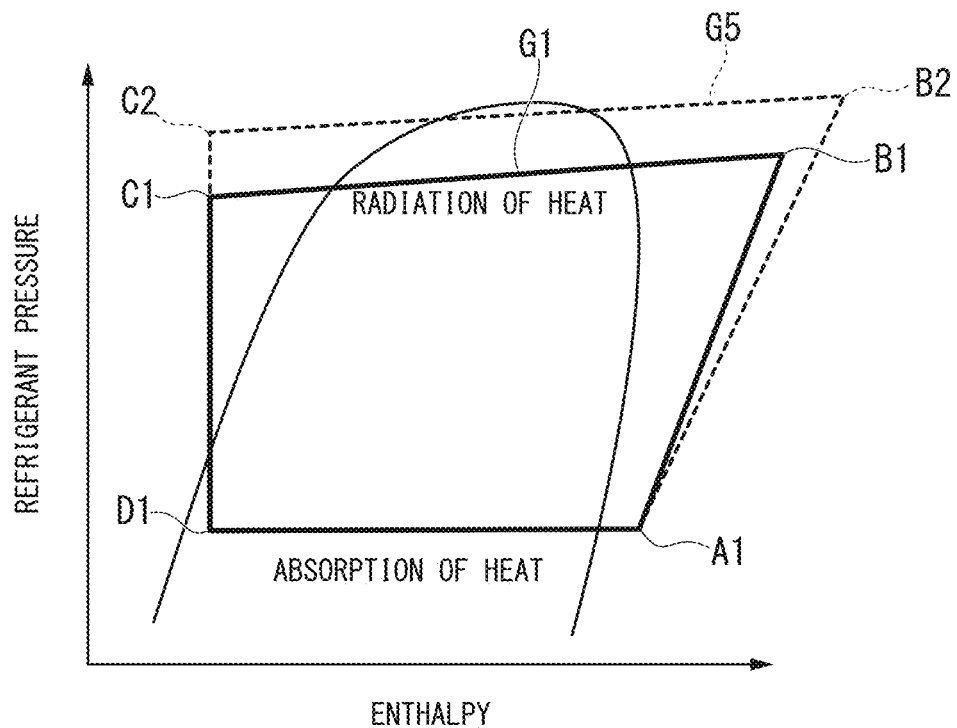
FIG. 8 is a view showing a refrigerant pressure-enthalpy diagram of the second waste power control of the motor-driven vehicle according to the embodiment of the invention.

FIG. 8 shows a refrigerant pressure-enthalpy diagram, where the vertical axis represents a refrigerant pressure, and the horizontal axis represents an enthalpy. In FIG. 8, a refrigerant pressure-enthalpy diagram G1 before the power waste control has been performed in the heating operation mode is indicated by a solid line. The refrigerant pressure-enthalpy diagram G1 before the power waste control has been performed is the same diagram as shown in FIG. 5 in the first power waste control.

A refrigerant pressure-enthalpy diagram G5 after the power waste control has been performed is indicated by a dotted line. In the refrigerant pressure-enthalpy diagram G5, the change from a point A1 to a point B2 represents a refrigerant state change in the compressor 21. The change from the point B2 to a point C2 represents a refrigerant state change in the indoor heat exchanger 55. The change from the point C2 to a point D1 represents a refrigerant state change in the expansion valve 22. The change from the point D1 to the point A1 represents a refrigerant state change in the outdoor heat exchanger 24.

Figure 9:
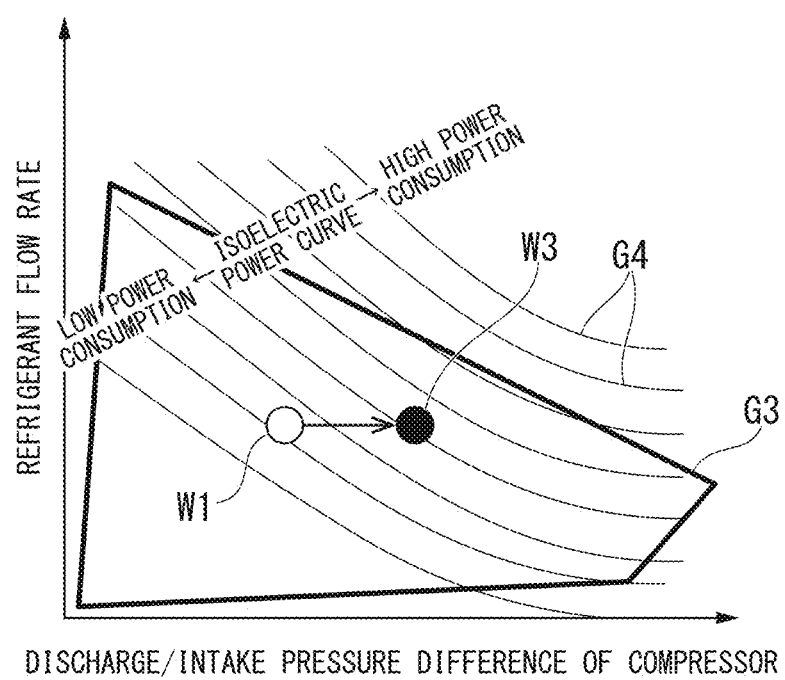
FIG. 9 is a diagram showing power consumption of the second waste power control of the motor-driven vehicle according to the embodiment of the invention.

In FIG. 9, diagrams G3 and G4 are the same as diagrams of FIG. 6 in the first power waste control. That is, in FIG. 9, a heating operation range of the vehicular air conditioner 10 is indicated by a diagram G3, and an isoelectric power curve is indicated by a diagram G4. The vertical axis represents a refrigerant flow rate, and the horizontal axis represents a discharge/intake pressure difference of the compressor. In FIG. 9, W1 denotes power consumption of the vehicular air conditioner 10 before the power waste control has been performed. W3 denotes power consumption of the vehicular air conditioner 10 after the power waste control has been performed.

Figure 7:
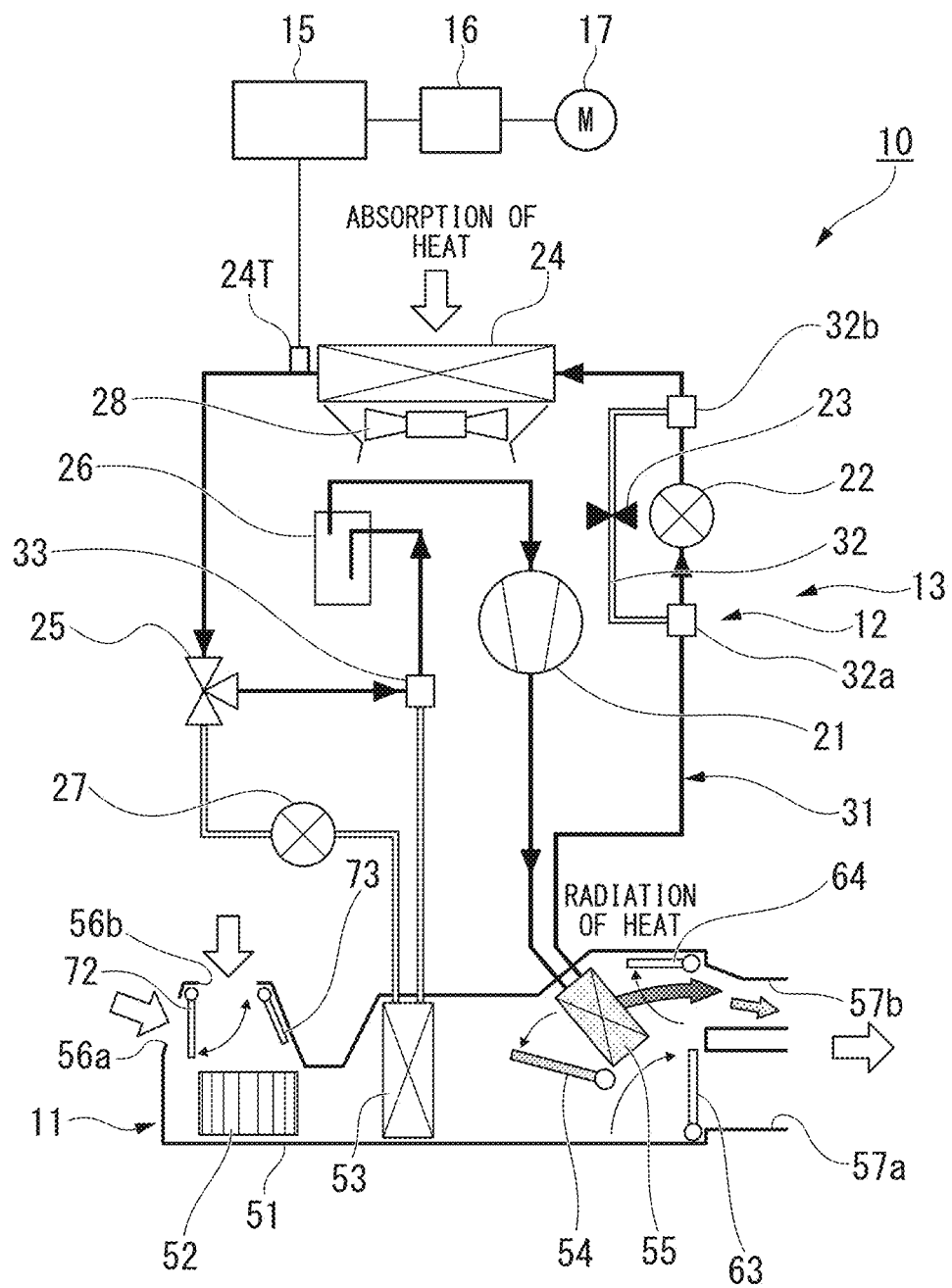
FIG. 7 is a configuration view showing a second waste power control of the motor-driven vehicle according to the embodiment of the invention.

As shown in FIG. 7, when the remaining capacity of the power storage device 16 is equal to or more than the predetermined value, the control device 15 controls the second air guide means 54 such that a passing-through air volume of the second air guide means 54 is decreased to be less than a passing-through air volume of the second air guide means 54 when the remaining capacity of the power storage device 16 is less than the predetermined value. The passing-through air volume of the indoor heat exchanger 55 is decreased by decreasing the passing-through air volume of the second air guide means 54. That is, an air volume which is supplied as heating air to the vehicle interior is decreased. Accordingly, it is possible to decrease the efficiency of the heating operation in comparison with before the power waste control has been performed.

In this state, in order to obtain the same heating capability as before the power waste control has been performed, it is necessary to increase the rotation speed of the compressor 21 to increase the refrigerant flow rate as shown in FIG. 7 and FIG. 8. By increasing the rotation speed of the compressor 21, the power consumption of the compressor 21 is increased from W1 to W3, and it is possible to secure an amount of waste power of the vehicular air conditioner 10 as illustrated in FIG. 7 and FIG. 9.

Thereby, in the second power waste control, when the power consumption W3 of the compressor 21 is larger than the electric power generated by the electric motor 17, it is possible to prevent overcharging of the power storage device 16. When the power consumption W3 of the compressor 21 is smaller than the electric power generated by the electric motor 17, it is possible to decrease a rate of increase of the remaining capacity of the power storage device 16.

Next, an example in which power consumption of the vehicular air conditioner 10 is increased by controlling the expansion valve 22 in addition to the compressor 21 and the second air guide means 54 of the vehicular air conditioner 10 as a third power waste control will be described with reference to FIG. 10 to FIG. 12.

(Third Power Waste Control)

In the third power waste control, the power consumption of the vehicular air conditioner 10 is increased by adding a control of the expansion valve 22 to the second power waste control.

Figure 11:
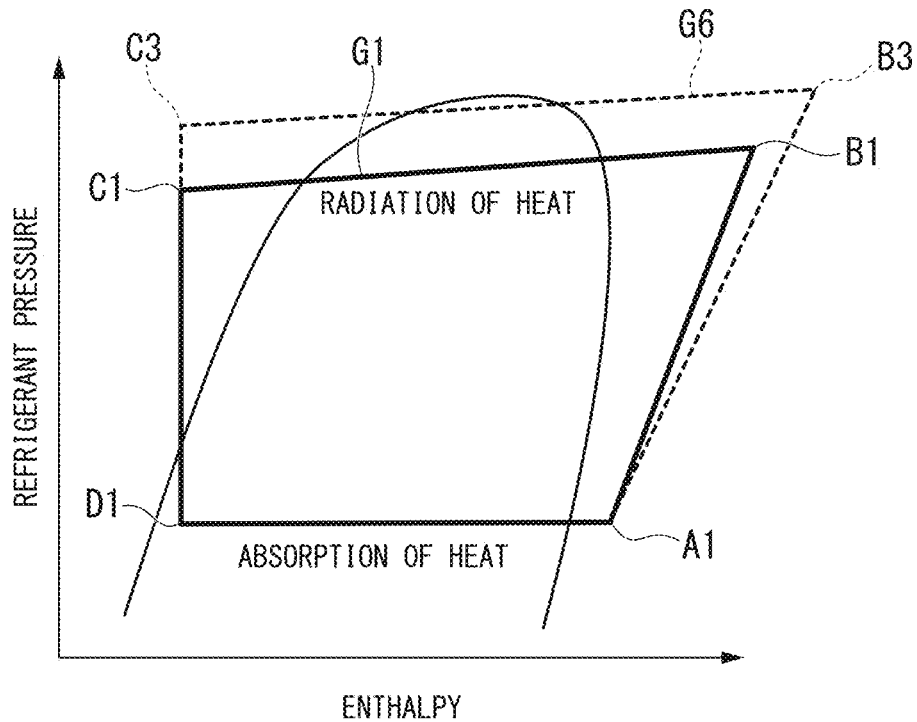
FIG. 11 is a view showing a refrigerant pressure-enthalpy diagram of the third waste power control of the motor-driven vehicle according to the embodiment of the invention.

FIG. 11 shows a refrigerant pressure-enthalpy diagram, where the vertical axis represents a refrigerant pressure, and the horizontal axis represents an enthalpy. In FIG. 11, a refrigerant pressure-enthalpy diagram G1 before the power waste control has been performed in the heating operation mode is indicated by a solid line. The refrigerant pressure-enthalpy diagram G1 before the power waste control has been performed is the same as in FIG. 5 of the first power waste control.

A refrigerant pressure-enthalpy diagram G6 after the power waste control has been performed is indicated by a dotted line. In the refrigerant pressure-enthalpy diagram G6, the change from a point A1 to a point B3 represents a refrigerant state change in the compressor 21. The change from the point B3 to a point C3 represents a refrigerant state change in the indoor heat exchanger 55. The change from the point C3 to a point D1 represents a refrigerant state change in the expansion valve 22. The change from the point D1 to the point A1 represents a refrigerant state change in the outdoor heat exchanger 24.

Figure 12:
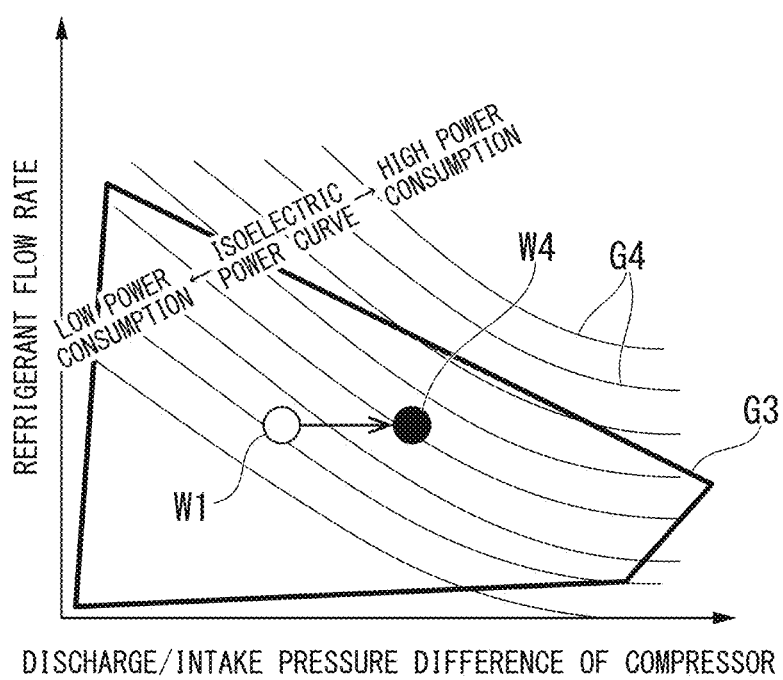
FIG. 12 is a diagram showing power consumption of the third waste power control of the motor-driven vehicle according to the embodiment of the invention.

In FIG. 12, diagrams G3 and G4 are the same as diagrams of FIG. 6 in the first power waste control. That is, in FIG. 12, a heating operation range of the vehicular air conditioner 10 is indicated by a diagram G3, and an isoelectric power curve is indicated by a diagram G4.

The vertical axis represents a refrigerant flow rate, and the horizontal axis represents a discharge/intake pressure difference of the compressor. In FIG. 12, W1 denotes power consumption of the vehicular air conditioner 10 before the power waste control has been performed. W4 denotes power consumption of the vehicular air conditioner 10 after the power waste control has been performed.

Figure 10:
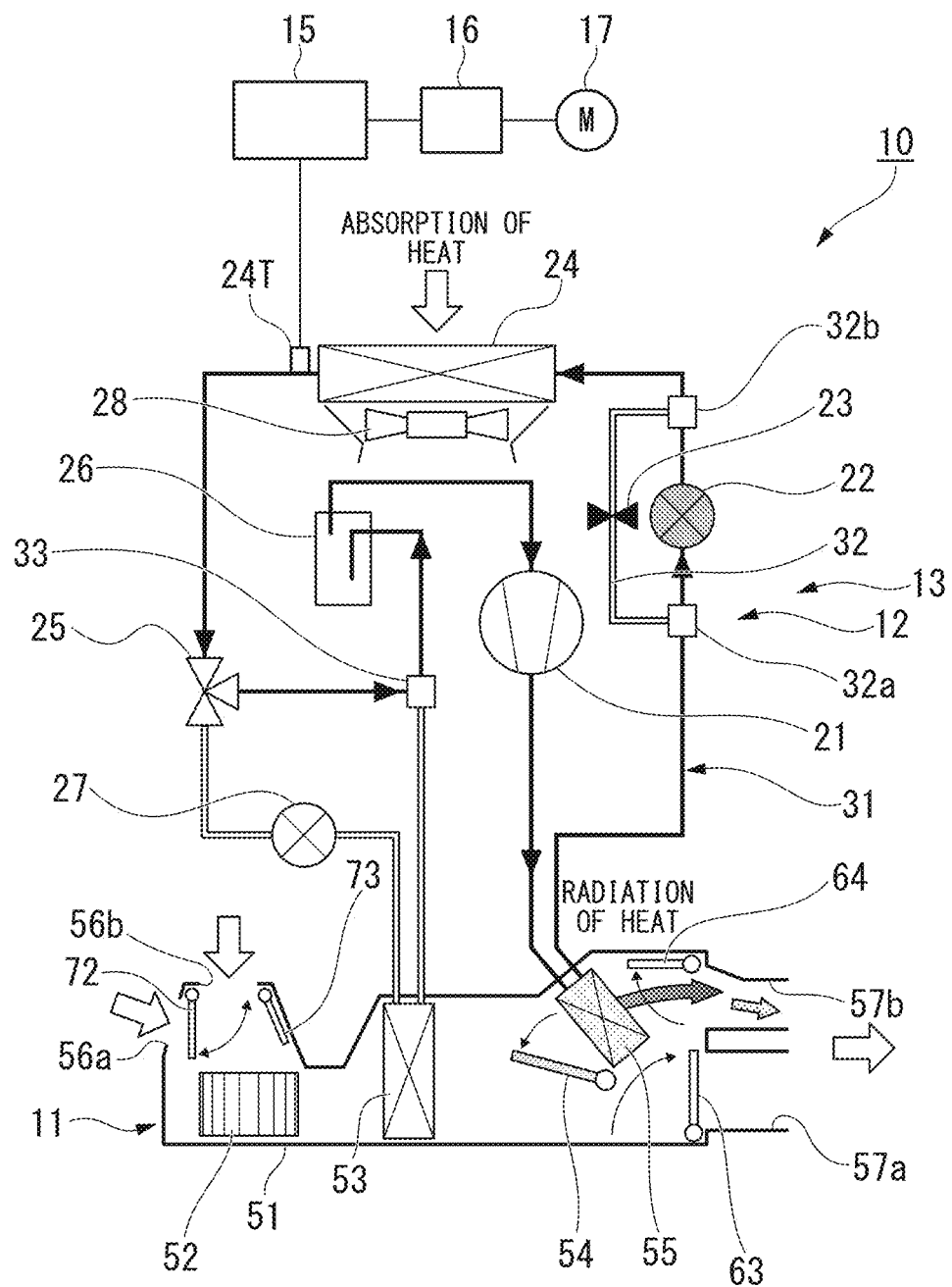
FIG. 10 is a configuration view showing a third waste power control of the motor-driven vehicle according to the embodiment of the invention.

As shown in FIG. 10, when the remaining capacity of the power storage device 16 is equal to or more than the predetermined value, the control device 15 controls the second air guide means 54 such that a passing-through air volume of the second air guide means 54 is decreased similarly to the second power waste control. Additionally, the control device 15 performs a control such that an aperture degree of the expansion valve 22 is decreased to be less than an aperture degree of the expansion valve 22 when the remaining capacity of the power storage device 16 is less than the predetermined value.

By decreasing the aperture degree of the expansion valve 22, the discharge refrigerant pressure of the compressor 21 is increased in comparison with before the power waste control has been performed. Accordingly, the compression efficiency of the compressor 21 is degraded, the refrigerant flow rate is decreased, and it becomes possible to decrease the efficiency of the heating operation.

In this state, in order to obtain the same heating capability as before the power waste control has been performed, it is necessary to increase the rotation speed of the compressor 21 to be more than that of the second power waste control and to increase the flow rate of the refrigerant discharged from the compressor 21 as shown in FIG. 10 and FIG. 11. By increasing the rotation speed of the compressor 21, the power consumption of the compressor 21 is increased from W1 to W4, and it is possible to secure an amount of waste power of the vehicular air conditioner 10 as shown in FIG. 10 and FIG. 12.

Thereby, in the third power waste control, when the power consumption W4 of the compressor 21 is larger than the electric power generated by the electric motor 17, it is possible to prevent overcharging of the power storage device 16. When the power consumption W4 of the compressor 21 is smaller than the electric power generated by the electric motor 17, it is possible to decrease a rate of increase of the remaining capacity of the power storage device 16.

An example in which power consumption of the vehicular air conditioner 10 is increased by controlling the compressor 21 and the expansion valve 22 of the vehicular air conditioner 10 as a fourth power waste control will be described with reference to FIG. 13 to FIG. 15.

(Fourth Power Waste Control)

Figure 14:
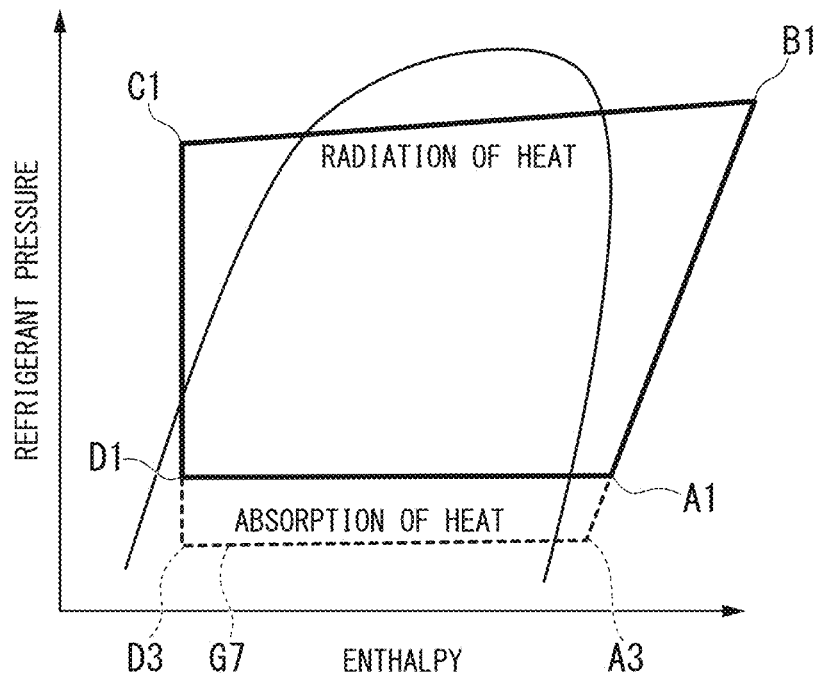
FIG. 14 is a view showing a refrigerant pressure-enthalpy diagram of the fourth waste power control of the motor-driven vehicle according to the embodiment of the invention.

FIG. 14 shows a refrigerant pressure-enthalpy diagram, where the vertical axis represents a refrigerant pressure, and the horizontal axis represents an enthalpy. In FIG. 14, a refrigerant pressure-enthalpy diagram G1 before the power waste control has been performed in the heating operation mode is indicated by a solid line. The refrigerant pressure-enthalpy diagram G1 before the power waste control has been performed is the same as in FIG. 5 of the first power waste control.

A refrigerant pressure-enthalpy diagram G7 after the power waste control has been performed is indicated by a dotted line. In the refrigerant pressure-enthalpy diagram G7, the change from a point A3 to a point B1 represents a refrigerant state change in the compressor 21. The change from the point B1 to a point C1 represents a refrigerant state change in the indoor heat exchanger 55. The change from the point C1 to a point D3 represents a refrigerant state change in the expansion valve 22. The change from the point D3 to the point A3 represents a refrigerant state change in the outdoor heat exchanger 24.

Figure 15:
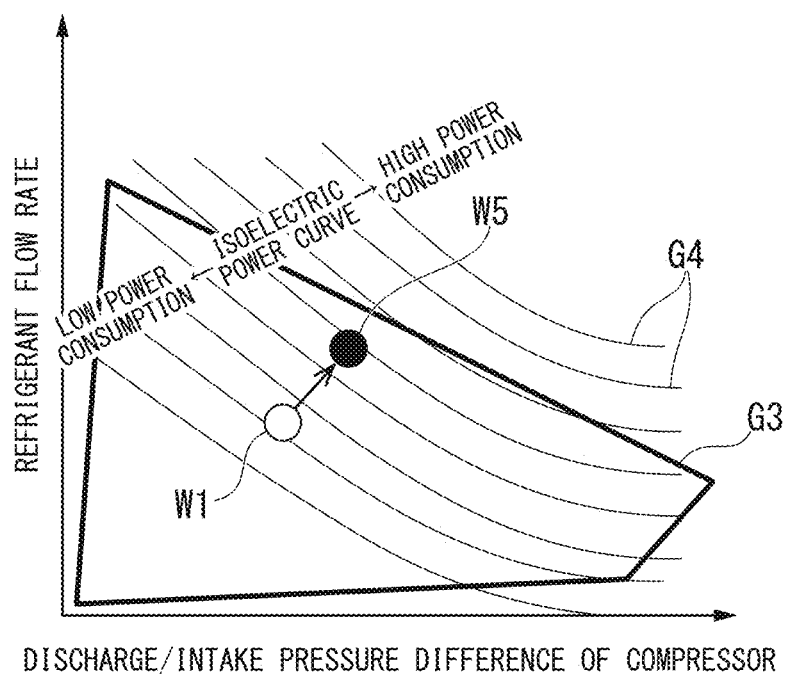
FIG. 15 is a diagram showing power consumption of the fourth waste power control of the motor-driven vehicle according to the embodiment of the invention.

In FIG. 15, diagrams G3 and G4 are the same as diagrams of FIG. 6 in the first power waste control. That is, in FIG. 15, a heating operation range of the vehicular air conditioner 10 is indicated by a diagram G3, and an isoelectric power curve is indicated by a diagram G4.

The vertical axis represents a refrigerant flow rate, and the horizontal axis represents a discharge/intake pressure difference of the compressor. In FIG. 15, W1 denotes power consumption of the vehicular air conditioner 10 before the power waste control has been performed. W5 denotes power consumption of the vehicular air conditioner 10 after the power waste control has been performed.

Figure 13:
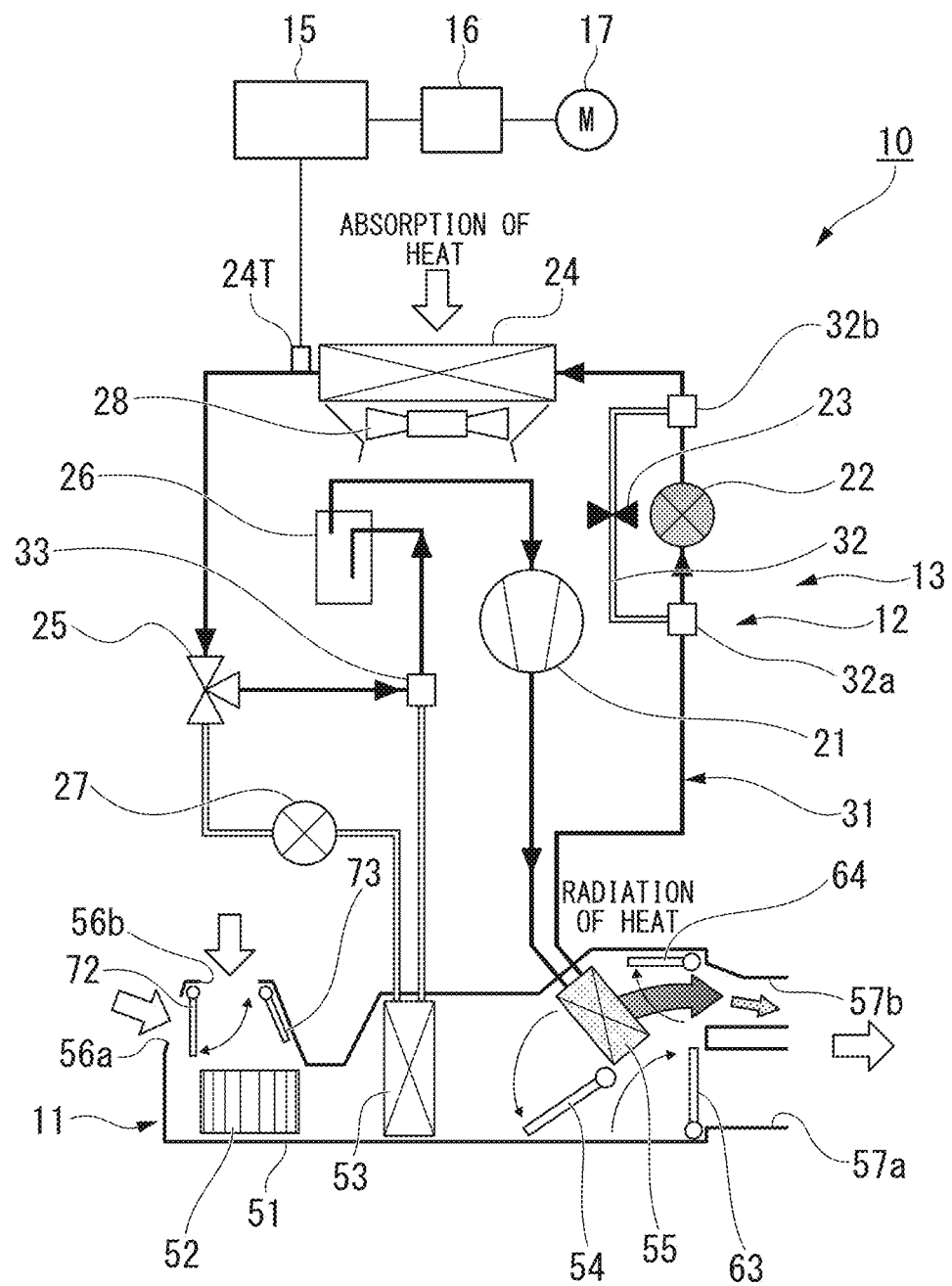
FIG. 13 is a configuration view showing a fourth waste power control of the motor-driven vehicle according to the embodiment of the invention.

As shown in FIG. 13, when the remaining capacity of the power storage device 16 is equal to or more than the predetermined value, the control device 15 controls the expansion valve 22 such that the aperture degree of the expansion valve 22 is increased to be more than the aperture degree of the expansion valve 22 when the remaining capacity of the power storage device 16 is less than the predetermined value. By increasing the aperture degree of the expansion valve 22, a refrigerant passing-through area of the expansion valve 22 is increased. Accordingly, as shown in FIG. 13 and FIG. 14, the discharge refrigerant pressure of the compressor 21 is decreased to be less than that before the power waste control has been performed. Thereby, it becomes possible to decrease the efficiency of the heating operation of the vehicular air conditioner 10 in comparison with before the power waste control has been performed.

In this state, in order to obtain the same heating capability as before the power waste control has been performed, it is necessary to increase the pressure of the refrigerant that is supplied to the indoor heat exchanger 55. That is, it is necessary to increase the rotation speed of the compressor 21 to increase the flow rate of the refrigerant that is discharged from the compressor 21. By increasing the rotation speed of the compressor 21, the power consumption of the compressor 21 is increased from W1 to W5, and it is possible to secure an amount of waste power of the vehicular air conditioner 10 as shown in FIG. 13 and FIG. 15.

Thereby, in the fourth power waste control, when the power consumption W5 of the compressor 21 is larger than the electric power generated by the electric motor 17, it is possible to prevent overcharging of the power storage device 16. When the power consumption W5 of the compressor 21 is smaller than the electric power generated by the electric motor 17, it is possible to decrease a rate of increase of the remaining capacity of the power storage device 16.

Next, as a fifth power waste control, an example in which power consumption of the vehicular air conditioner 10 is increased by controlling the aperture degree of the expansion valve 22 to be in a fully open state from the state in the fourth power waste control will be described with reference to FIG. 16 to FIG. 18.

(Fifth Power Waste Control)

Figure 17:
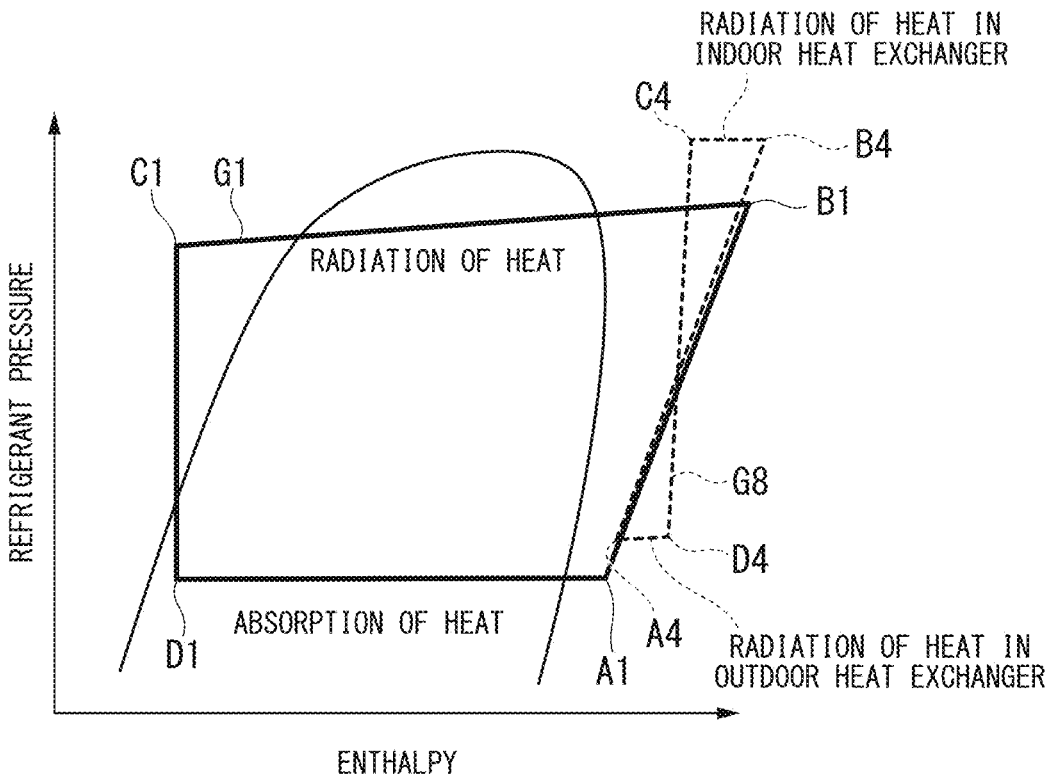
FIG. 17 is a view showing a refrigerant pressure-enthalpy diagram of the fifth waste power control of the motor-driven vehicle according to the embodiment of the invention.

FIG. 17 shows a refrigerant pressure-enthalpy diagram, where the vertical axis represents a refrigerant pressure, and the horizontal axis represents an enthalpy. In FIG. 17, a refrigerant pressure-enthalpy diagram G1 before the power waste control has been performed in the heating operation mode is indicated by a solid line. The refrigerant pressure-enthalpy diagram G1 before the power waste control has been performed is the same as in FIG. 5 of the first power waste control.

A refrigerant pressure-enthalpy diagram G8 after the power waste control has been performed is indicated by a dotted line. In the refrigerant pressure-enthalpy diagram G8, the change from a point A4 to a point B4 represents a refrigerant state change in the compressor 21. The change from the point B4 to a point C4 represents a refrigerant state change in the indoor heat exchanger 55. The change from the point C4 to a point D4 represents a refrigerant state change in the expansion valve 22. The change from the point D4 to the point A4 represents a refrigerant state change in the outdoor heat exchanger 24.

Figure 18:
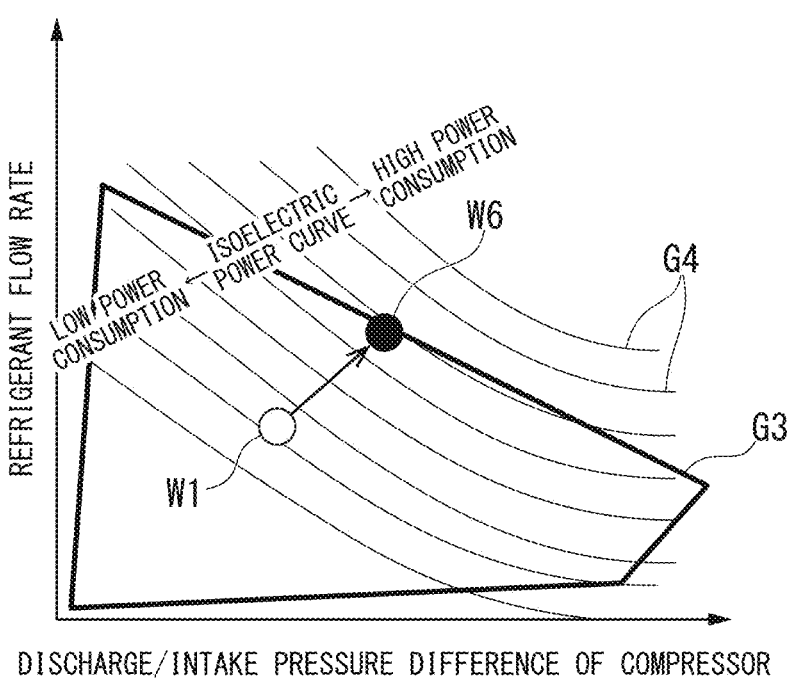
FIG. 18 is a diagram showing power consumption of the fifth waste power control of the motor-driven vehicle according to the embodiment of the invention.

In FIG. 18, diagrams G3 and G4 are the same as diagrams of FIG. 6 in the first power waste control. That is, in FIG. 18, a heating operation range of the vehicular air conditioner 10 is indicated by a diagram G3, and an isoelectric power curve is indicated by a diagram G4.

The vertical axis represents a refrigerant flow rate, and the horizontal axis represents a discharge/intake pressure difference of the compressor. In FIG. 18, W1 denotes power consumption of the vehicular air conditioner 10 before the power waste control has been performed. W6 denotes power consumption of the vehicular air conditioner 10 after the power waste control has been performed.

Figure 16:
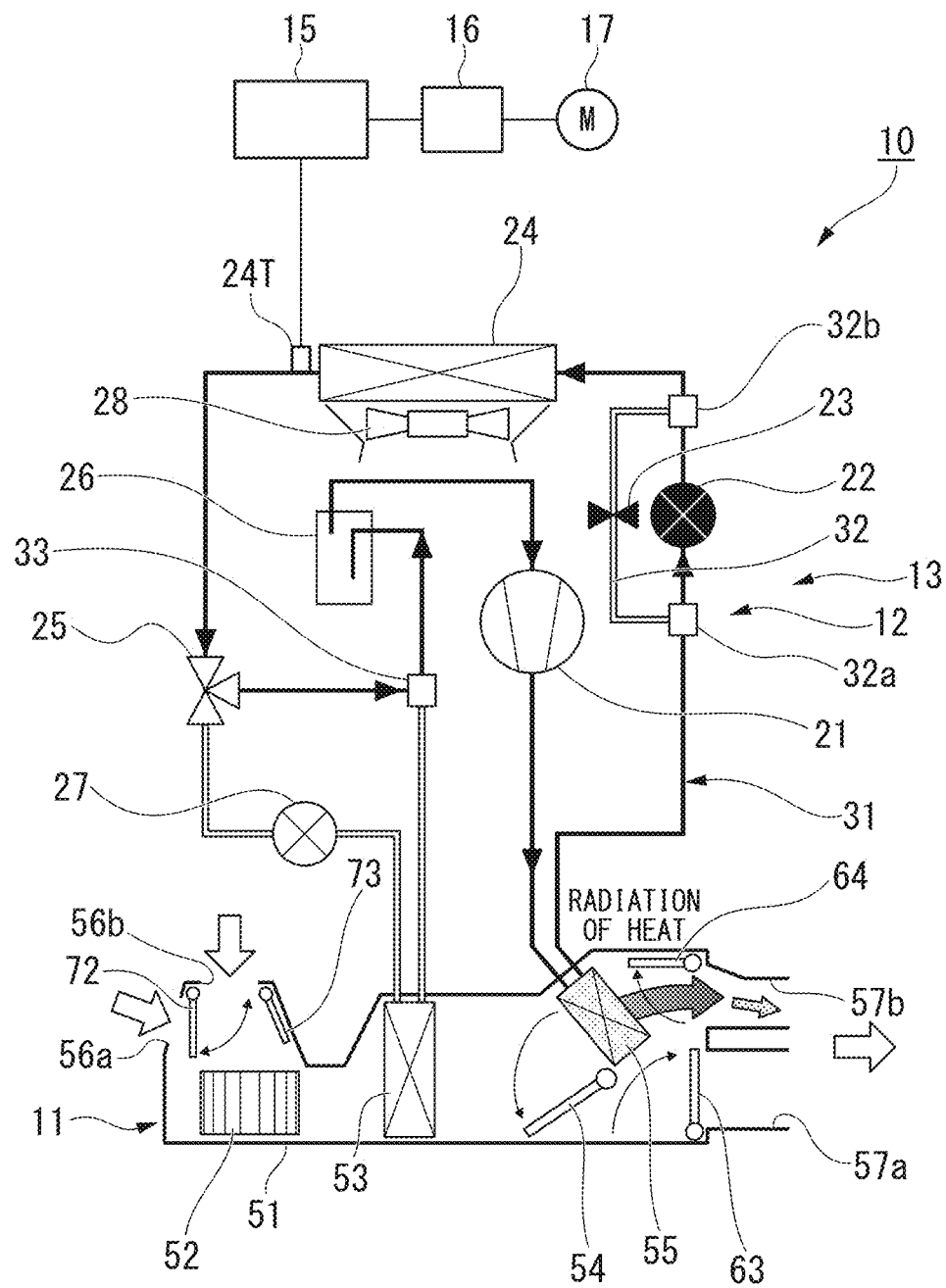
FIG. 16 is a configuration view showing a fifth waste power control of the motor-driven vehicle according to the embodiment of the invention.

As shown in FIG. 16, the control device 15 controls the aperture degree of the expansion valve 22 to be in a fully open state from the state in the fourth power waste control when the remaining capacity of the power storage device 16 is equal to or more than the predetermined value. By allowing the aperture degree of the expansion valve 22 to be in a fully open state, the refrigerant passing-through area of the expansion valve 22 is increased to the maximum. In comparison with before the power waste control has been performed, the heating operation mode of the vehicular air conditioner 10 transitions to a hot-gas operation as indicated by the diagram G8 in FIG. 17, and it becomes impossible to perform absorption of heat by the outdoor heat exchanger 24. That is, the amount of work of the compressor 21 (refer to FIG. 16) becomes equivalent to the heating capability.

Accordingly, as shown in FIG. 16 and FIG. 17, in order to secure the heating of the vehicular air conditioner 10 similar to that before the power waste control has been performed, it is necessary to increase the rotation speed of the compressor 21 in comparison with that in the fourth power waste control. By increasing the rotation speed of the compressor 21, the discharge pressure of the refrigerant discharged from the compressor 21 is increased, the flow rate of the refrigerant is increased, and the heating similar to that before the power waste control has been performed is secured.

On the other hand, by increasing the rotation speed of the compressor 21 to be more than that in the fourth power waste control, the power consumption of the compressor 21 is increased from W1 to W6, and it is possible to secure an amount of waste power of the vehicular air conditioner 10 as shown in FIG. 16 and FIG. 18.

Thereby, in the fifth power waste control, when the power consumption W6 of the compressor 21 is larger than electric power generated by the electric motor 17, it is possible to prevent overcharging of the power storage device 16. When the power consumption W6 of the compressor 21 is smaller than electric power generated by the electric motor 17, it is possible to decrease a rate of increase of the remaining capacity of the power storage device 16.

Next, as a sixth power waste control, an example in which the power consumption of the vehicular air conditioner 10 is increased by performing the first to fifth power waste controls of the vehicular air conditioner 10 sequentially from one having the lowest power consumption will be described with reference to a flowchart of FIG. 19.

(Sixth Power Waste Control)

It is assumed that the power consumptions (that is, the amounts of waste power) W2 to W6 in the first to fifth power waste controls satisfy, for example, a relationship of the first amount of waste power W2<the second amount of waste power W3<the third amount of waste power W4<the fourth amount of waste power W5<the fifth amount of waste power W6. The first to fifth amounts of waste power W2 to W6 differ depending on specifications of the motor-driven vehicle Ve.

Figure 19:
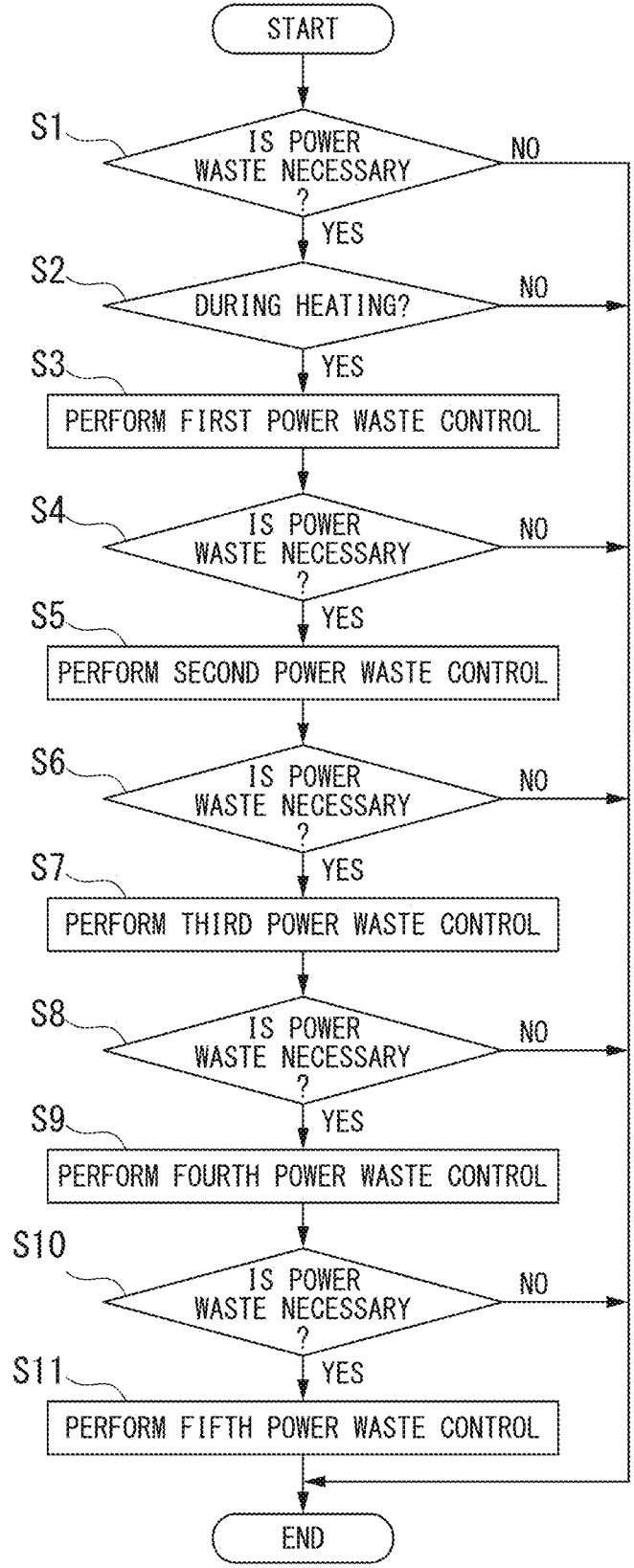
FIG. 19 is a flowchart showing a sixth waste power control of the motor-driven vehicle according to the embodiment of the invention.

As shown in FIG. 19, for example, when the motor-driven vehicle Ve is braked while traveling on a long downhill road in the heating operation mode, the rotation of the driving wheel is transmitted to the output shaft of the electric motor 17, and electric power is regenerated at the electric motor 17 by the rotation of the output shaft. An alternating current regenerated by the electric motor 17 is converted into a direct current by the inverter. The converted direct current is supplied from the inverter to the power storage device 16 and is stored in the power storage device 16.

In this state, in Step S1, the control device 15 determines whether or not the remaining capacity of the power storage device 16 is equal to or more than a predetermined value (that is, power waste is necessary) based on chargeable power. When it is determined that power waste is not necessary, the power waste control is finished. On the other hand, when it is determined that power waste is necessary, the routine proceeds to Step S2. In Step S2, the control device 15 determines whether or not the vehicular air conditioner 10 is in the heating operation mode.

When it is determined that the vehicular air conditioner 10 is not in the heating operation mode, the power waste control is finished. On the other hand, when it is determined that the vehicular air conditioner 10 is in the heating operation mode, the routine proceeds to Step S3. In Step S3, the first power waste control is performed. That is, the power consumption of the vehicular air conditioner 10 is increased from W1 to W2 by controlling the compressor 21 and the first air guide means 28 of the vehicular air conditioner 10.

In this state, in Step S4, the control device 15 determines whether or not the remaining capacity of the power storage device 16 is equal to or more than a predetermined value (that is, power waste is necessary) based on chargeable power. When it is determined that power waste is not necessary, the power waste control is finished. On the other hand, when it is determined that power waste is necessary, the routine proceeds to Step S5. In Step S5, the second power waste control is performed. That is, the power consumption of the vehicular air conditioner 10 is increased from W2 to W3 by controlling the compressor 21 and the second air guide means 54 of the vehicular air conditioner 10.

In this state, in Step S6, the control device 15 determines whether or not the remaining capacity of the power storage device 16 is equal to or more than a predetermined value (that is, power waste is necessary) based on chargeable power. When it is determined that power waste is not necessary, the power waste control is finished. On the other hand, when it is determined that power waste is necessary, the routine proceeds to Step S7. In Step S7, the third power waste control is performed. That is, the power consumption of the vehicular air conditioner 10 is increased from W3 to W4 by controlling the expansion valve 22 in addition to the compressor 21 and the second air guide means 54 of the vehicular air conditioner 10.

In this state, in Step S8, the control device 15 determines whether or not the remaining capacity of the power storage device 16 is equal to or more than a predetermined value (that is, power waste is necessary) based on chargeable power. When it is determined that power waste is not necessary, the power waste control is finished. On the other hand, when it is determined that power waste is necessary, the routine proceeds to Step S9. In Step S9, the fourth power waste control is performed. That is, the power consumption of the vehicular air conditioner 10 is increased from W4 to W5 by controlling the compressor 21 and the expansion valve 22 of the vehicular air conditioner 10.

In this state, in Step S10, the control device 15 determines whether or not the remaining capacity of the power storage device 16 is equal to or more than a predetermined value (that is, power waste is necessary) based on chargeable power. When it is determined that power waste is not necessary, the power waste control is finished. On the other hand, when it is determined that power waste is necessary, the routine proceeds to Step S11. In Step S11, the fifth power waste control is performed. That is, the power consumption of the vehicular air conditioner 10 is increased from W5 to W6 by controlling the aperture degree of the expansion valve 22 to be in the fully open state from the state in the fourth power waste control. In this way, by sequentially selecting and performing the first to fifth power waste controls from one having the lowest power consumption to one having the highest power consumption, it is possible to prevent excessive waste of the regenerative power.

As described using Steps S1 to S11 in FIG. 19, the control device 15 controls the vehicular air conditioner 10 in accordance with the magnitude of the electric energy regenerated by the electric motor (traveling motor) 17 when the remaining capacity of the power storage device 16 is equal to or more than a predetermined value. Specifically, the expansion valve 22, the first air guide means 28, and the second air guide means 54 are selected and controlled at the same time as operating the compressor 21. Accordingly, it is possible to decrease the efficiency of the heating operation in accordance with the regenerated electric energy.

In this way, by performing the first to fifth power waste controls each having one of wasted electric energies that are different from one another sequentially from one having the lowest wasted electric energy, it is possible to prevent excessive power waste and also satisfy a power waste request. In other words, it is possible to prevent excessive waste of electric power regenerated by the electric motor 17 and to prevent a situation in which regeneration is unavailable (insufficient regenerative torque) due to full charging of the power storage device 16 while preventing a reduction in SOC when regeneration has been finished.

The technical scope of the invention is not limited to the embodiment described above, and various changes can be added to the embodiment without departing from the scope of the invention.

For example, the above embodiment is described using an example of an electric vehicle as a motor-driven vehicle; however, the invention is not limited thereto. The invention may be applied to, for example, a hybrid vehicle, a fuel-cell vehicle, and the like as other vehicles.

What is claimed is:

1. A motor-driven vehicle that comprises
an electric motor,
a power storage device that is electrically connected to the electric motor, and
a control device that controls the electric motor and the power storage device,
the motor-driven vehicle comprising
a refrigerant circuit which has:
a compressor that compresses and discharges an intake refrigerant;
an indoor heat exchanger that exchanges heat with the compressed refrigerant;
an expansion valve that decompresses the refrigerant which passes through the indoor heat exchanger;
an outdoor heat exchanger that exchanges heat with the decompressed refrigerant and allows the refrigerant to return to the compressor;
a first air guide device that controls a passing-through air volume of the outdoor heat exchanger; and
a second air guide device that controls a passing-through air volume of the indoor heat exchanger,
wherein when a remaining capacity of the power storage device is equal to or more than a predetermined value, the control device sequentially selects and performs a plurality of waste power controls with different waste power amount by controlling the expansion valve, the first air guide device, and the second air guide device in accordance with a magnitude of electric energy regenerated by the electric motor.

2. The motor-driven vehicle according to claim 1, wherein the control device sequentially selects and performs a plurality of waste power controls with different power consumption, from one having lowest power consumption.

3. The motor-driven vehicle according to claim 2, wherein the control device sequentially selects and performs first to fifth waste power controls with different power consumption, from one having lowest power consumption.

4. The motor-driven vehicle according to claim 3, wherein the control device performs the first waste power control in which, when a remaining capacity of the power storage device is equal to or more than a predetermined value, the control device operates the compressor and decreases a passing-through air volume of a first air guide device that controls a passing-through air volume of the outdoor heat exchanger to be less than a passing-through air volume of the first air guide device when the remaining capacity of the power storage device is less than the predetermined value.

5. The motor-driven vehicle according to claim 3, wherein the control device performs the second waste power control in which, when a remaining capacity of the power storage device is equal to or more than a predetermined value, the control device operates the compressor and decreases a passing-through air volume of a second air guide device that controls a passing-through air volume of the indoor heat exchanger to be less than a passing-through air volume of the second air guide device when the remaining capacity of the power storage device is less than the predetermined value.

6. The motor-driven vehicle according to claim 3, wherein the control device performs the third waste power control in which, when the remaining capacity of the power storage device is equal to or more than the predetermined value, the control device reduces an aperture degree of the expansion valve to be less than an aperture degree of the expansion valve when the remaining capacity of the power storage device is less than the predetermined value.

7. The motor-driven vehicle according to claim 3, wherein the control device performs the fourth waste power control in which, when a remaining capacity of the power storage device is equal to or more than a predetermined value, the control device operates the compressor and increases an aperture degree of the expansion valve to be more than an aperture degree of the expansion valve when the remaining capacity of the power storage device is less than the predetermined value.

8. The motor-driven vehicle according to claim 3, wherein the control device performs the fifth waste power control in which the control device allows the aperture degree of the expansion valve to be in a fully open state when the remaining capacity of the power storage device is equal to or more than the predetermined value.

\* \* \* \* \*